(12) United States Patent
Chen

(10) Patent No.: US 11,295,596 B2
(45) Date of Patent: Apr. 5, 2022

(54) MONITORING DEVICE, MONITORING BASE STATION, AND MONITORING SYSTEM

(71) Applicant: SHENZHEN NEARBYEXPRESS TECHNOLOGY DEVELOPMENT COMPANY LIMITED, Guangdong (CN)

(72) Inventor: Wenlai Chen, Shenzhen (CN)

(73) Assignee: SHENZHEN NEARBYEXPRESS TECHNOLOGY DEVELOPMENT COMPANY LIMITED, Shenzhen (CN)

(*) Notice: Subject to any disclaimer, the term of this patent is extended or adjusted under 35 U.S.C. 154(b) by 0 days.

(21) Appl. No.: 17/027,765

(22) Filed: Sep. 22, 2020

(65) Prior Publication Data

US 2021/0043059 A1 Feb. 11, 2021

Related U.S. Application Data

(63) Continuation of application No. PCT/CN2019/079077, filed on Mar. 21, 2019.

(30) Foreign Application Priority Data

Mar. 22, 2018 (CN) .......................... 201810240526.5

(51) Int. Cl.
*G08B 21/18* (2006.01)
*G08B 29/04* (2006.01)
(Continued)

(52) U.S. Cl.
CPC .......... *G08B 21/182* (2013.01); *G08B 29/04* (2013.01); *H04W 52/0206* (2013.01); *H04N 7/183* (2013.01)

(58) Field of Classification Search
CPC .. G08B 21/182; G08B 29/04; H04W 52/0206
See application file for complete search history.

(56) References Cited

U.S. PATENT DOCUMENTS

2011/0164134 A1  7/2011  Jezierski et al.
2013/0150028 A1* 6/2013  Akins ................... H04W 4/021
                                                        455/427
(Continued)

FOREIGN PATENT DOCUMENTS

CN  104883483 A  9/2015
CN  106125621 A  11/2016
(Continued)

OTHER PUBLICATIONS

International Search Report in PCT/CN2019/079077 dated Jun. 12, 2019, 7 pages.
(Continued)

*Primary Examiner* — Hongmin Fan
(74) *Attorney, Agent, or Firm* — Metis IP LLC

(57) ABSTRACT

The present disclosure disclosures a monitoring device. The monitoring device includes a monitoring module configured to obtain monitoring data of a surrounding environment of the monitoring device; a first wireless communication module configured to transmit the monitoring data; a second wireless communication module configured to receive a control instruction; and a first control module configured to control the monitoring module, the first communication module, and the second communication module to work.

10 Claims, 19 Drawing Sheets

(51) Int. Cl.
*H04W 52/02* (2009.01)
*H04N 7/18* (2006.01)

(56) References Cited

U.S. PATENT DOCUMENTS

| | | | | |
|---|---|---|---|---|
| 2014/0031988 | A1* | 1/2014 | Reeder | F24F 11/30 |
| | | | | 700/276 |
| 2015/0061877 | A1* | 3/2015 | Kates | G08B 17/10 |
| | | | | 340/628 |
| 2015/0097678 | A1* | 4/2015 | Sloo | G08B 25/008 |
| | | | | 340/602 |
| 2017/0178476 | A1 | 6/2017 | Jeon et al. | |
| 2017/0366753 | A1 | 12/2017 | Liu et al. | |
| 2019/0147726 | A1* | 5/2019 | Blum | G08B 29/188 |
| | | | | 340/587 |

FOREIGN PATENT DOCUMENTS

| | | |
|---|---|---|
| CN | 106303416 A | 1/2017 |
| CN | 206442461 U | 8/2017 |
| CN | 108024096 A | 5/2018 |
| CN | 108282641 A | 7/2018 |
| CN | 208337739 U | 1/2019 |
| WO | 2018028129 A1 | 2/2018 |
| WO | 2018028130 A1 | 2/2018 |

OTHER PUBLICATIONS

Written Opinion in PCT/CN2019/079077 dated Jun. 12, 2019, 10 pages.
The Extended European Search Report in European Application No. 19771786.1 dated Oct. 20, 2020, 9 pages.

* cited by examiner

MONITORING DEVICE, MONITORING BASE STATION, AND MONITORING SYSTEM

CROSS-REFERENCE TO RELATED APPLICATIONS

This application is a continuation of International Application No. PCT/CN2019/079077 filed on Mar. 21, 2019, which claims the priority of Chinese Patent Application No. 201810240526.5 filed on Mar. 22, 2018, the contents of each of which are hereby incorporated by reference in its entirety.

TECHNICAL FIELD

The present disclosure relates to the field of security technology, in particular to monitoring devices, monitoring base stations, and monitoring systems.

BACKGROUND

With the rapid development of the Internet, network products gradually cover each corner of our lives. Due to the development and innovation of Internet protocol Camera (IPC), the IPCs are widely used in many fields, such as education, commerce, medical, public utilities, family, etc. At present, the IPC usually uses a wireless communication to interact with a supporting base station or terminal. However, this communication manner has poor stability, more likely to fail to receive the control instruction from the user due to network problems, or fail to obtain or obtain in time the monitoring data that the user needs, etc., thereby resulting in poor user experience.

SUMMARY

An embodiment of the present disclosure provides a monitoring device. The monitoring device includes a monitoring module configured to obtain monitoring data of a surrounding environment of the monitoring device, a first wireless communication module configured to transmit the monitoring data, a second wireless communication module configured to receive a control instruction, and a first control module configured to control the monitoring module, the first wireless communication module, and the second wireless communication module to work.

An embodiment of the present disclosure provides a monitoring base station. The monitoring base station includes a third wireless communication module configured to receive a control instruction sent by a control terminal and monitoring data sent by a monitoring device, a fourth wireless communication module configured to transmit the control instruction, a second data processing module configured to process the control instruction received by the third wireless communication module and is also configured to process the monitoring data received by the third wireless communication module, and a second control module configured to control the third wireless communication module, the fourth wireless communication module, and the second data processing module to work.

An embodiment of the present disclosure provides a control device. The control device includes a first acquisition module configured to acquire data from a monitoring device or a monitoring base station; a second acquisition module configured to acquire control instructions input by a user; and a transmission module configured to transmit the control instructions input by the user.

An embodiment of the present disclosure provides a monitoring system. The monitoring system includes a monitoring device, a monitoring base station, and a mobile terminal. The monitoring device includes at least a monitoring module, a first wireless communication module, a second wireless communication module, and a first control module. The monitoring base station includes at least a third wireless communication module, a fourth wireless communication module, a second control module, and a second data processing module. The control terminal includes at least a transmission module, a first acquisition module, and a second acquisition module. The control terminal obtains the control instruction input by the user through the second acquisition module. The control terminal transmits the control instruction to the monitoring base station through the transmission module. The monitoring base station receives the control instruction from the control terminal through the third communication module. The monitoring base station transmits the control instruction to the monitoring device through the fourth communication module. The monitoring device receives the control instruction from the monitoring base station through the second communication module. The monitoring device controls the monitoring module, the first communication module, and the second communication module to work based on the control instruction through the first control module. The monitoring base station controls the third communication module, the fourth communication module, and the second data processing module to work based on the control instruction through the second control module.

An embodiment of the present disclosure provides a monitoring system. The monitoring system includes a monitoring device and a control terminal. The monitoring device includes at least a monitoring module, a first communication module, a second communication module, and a first control module. The control terminal includes at least a transmission module, a first acquisition module, and a second acquisition module. The control terminal transmits a control instruction to the monitoring device through the transmission module. The monitoring device receives the control instruction from the control terminal through the second communication module. The monitoring device controls the monitoring module, the first communication module, and the second communication module to work based on the control instruction through the first control module.

DETAILED DESCRIPTION

Figure 1:
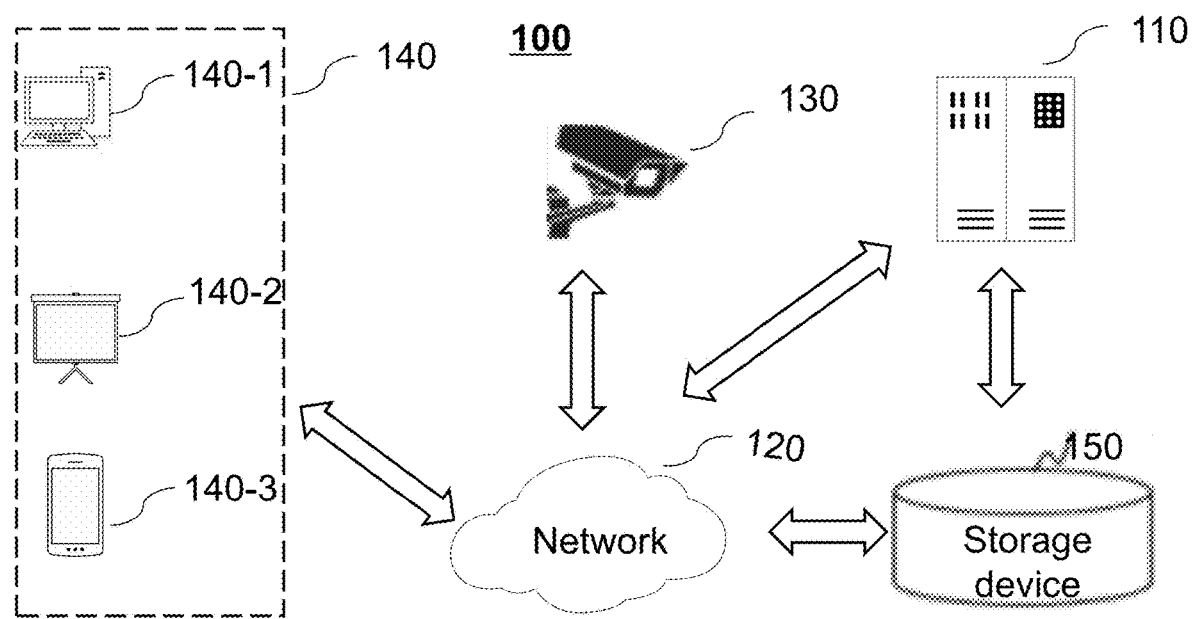
FIG. 1 is a schematic diagram of a monitoring system 100 according to some embodiments of the present disclosure.

The embodiments of the present disclosure are further described in detail in connection with drawings and embodiments. It should be understood that the specific embodiments described herein are only used to explain the embodiments of the present disclosure, and not intended to limit the scope of the present disclosure. In addition, it should be noted that, for purpose of illustration and description, the drawings only show a part but not all of the structures related to the embodiments of the present disclosure.

In order to explain the technical solutions of the embodiments of the present disclosure more clearly, the following may briefly introduce the drawings that need to be used in the description of the embodiments. Obviously, the drawings in the following description are only some examples or embodiments of the disclosure. For those of ordinary skill in the art, without creative work, the disclosure can be applied to other similar scenarios according to these drawings. Unless obviously obtained from the context or the context illustrates otherwise, the same numeral in the drawings refers to the same structure or operation.

A flowchart is used in this disclosure to illustrate the operations performed by the system according to the embodiments of the disclosure. It should be understood that the preceding or following operations are not necessarily performed exactly in order. Instead, the various operations may be processed in reverse order or simultaneously. At the same time, other operations may be added to these processes, or a step or several operations may be removed from these processes.

It should be understood that "system," "device," "module," "unit," and/or "component" used herein is a method for distinguishing different components, elements, parts, parts, or assemblies of different levels. However, if other words can achieve the same purpose, the words can be replaced by other expressions.

Although the present disclosure makes various references to certain modules or units in the system according to the embodiments of this disclosure, any number of different modules or units may be used and run on the client and/or server. The modules are merely illustrative, and different modules may be used for different aspects of the system and method.

As used in the disclosure and the appended claims, the singular forms "a," "an," and "the" include plural referents unless the content clearly dictates otherwise. Generally speaking, the terms "include" and "including" only suggest that the clearly identified operations and elements are included, and these operations and elements do not constitute an exclusive list, and the method or device may also include other operations or elements.

FIG. 1 is a schematic diagram illustrating a monitoring system 100 according to some embodiments of the present disclosure.

As shown in FIG. 1, the monitoring system 100 may include, but not be limited to, one or more monitoring devices 130, a server 110, a network 120, one or more control terminals 140, and a storage device 150. The monitoring system 100 may perform remote monitoring. The monitoring system 100 remotely obtains data of a surrounding environment through the monitoring device 130 and transmits the monitoring data to the control terminal 140 through the network 120. Therefore, the user can monitor, manage, and watch a monitoring target in real-time without being restricted by time and place. In some embodiments, the monitoring system 100 may also be applied to fields such as banking, finance, water conservancy, shipping, retail, manufacturing, large enterprises, public security, fire protection, community security, etc. The monitoring system may include the server 110, the network 120, the one or more monitoring devices 130, the control terminal 140, and the storage device 150. The server 110 may include a monitoring base station (not shown).

In some embodiments, the server 110 may be a single server or a server group. The server group may be centralized or distributed. In some embodiments, the server 110 may be local or remote. For example, the server 110 may access data and/or information stored in the storage device 150 and the monitoring device 130 through the network 120. As another example, the server 110 may transmit the monitoring data stored locally, from the storage device 150, or the monitoring device 130 to the control terminal 140 through the network 120. As still another example, the server 110 may transmit data and/or information from the control terminal, for example, control instructions, to the monitoring device 130 through the network 120. As still a further example, the server 110 may be directly connected to the storage device 150 and the monitoring device 130 to access stored information and/or data, such as monitoring data. In some embodiments, the server 110 may be implemented on a cloud platform. For example, the cloud platform may include a private cloud, a public cloud, a hybrid cloud, a community cloud, a distributed cloud, an inter-cloud, a multi-cloud, or the like, or any combination thereof. Taking the control terminal 140 controlling the monitoring device 130 for monitoring as an example, the control terminal 140 transmits a monitoring control instruction to the server 110 through the network 120, and the server 110 transmits the control instruction to the monitoring device 130 through the network 120. After receiving the control instruction, the monitoring device 130 begins real-time monitoring.

In some embodiments, the control terminal 140 may include, but not be limited to, a desktop computer 140-1, an in-vehicle built-in device 140-2, a mobile device 140-3, or the like, or any combination thereof. In some embodiments, the in-vehicle built-in device 140-2 may include, but not be limited to, an in-vehicle computer, an in-vehicle head-up display (HUD), an in-vehicle automatic diagnostic system (OBD), a driving recorder, an in-vehicle navigation, or the like, or any combination thereof. In some embodiments, the mobile device 140-3 may include, but not be limited to, a notebook computer, a smartphone, a personal digital assistance (PDA), a tablet computer, a handheld game console, smart glasses, a smartwatch, a wearable device, a virtual display device, a display enhancement device, or the like, or any combination thereof. In some embodiments, the control terminal 140 may transmit a control instruction to the monitoring device 130, the server 110, or the storage device 150 through the network 120. For example, the control terminal 140 may transmit a control instruction for real-time monitoring to the monitoring device 130, and the monitoring device 130 performs the real-time monitoring after receiving the control instruction. In some embodiments, the control terminal 140 may receive the data and/or information from the monitoring device 130, the server 110, or the storage device 150 through the network 120. For example, the control terminal may transmit a control instruction for acquiring the monitoring data to the server 110, and after receiving the control instruction, the server 110 transmits local monitoring data or real-time monitoring data from the monitoring device to the control terminal 140.

The storage device 150 may store data and/or information. The data and/or information may include video data, audio data, network information, monitoring device information, user information, sensor information, or the like. In some embodiments, the storage device 150 may store data obtained from the monitoring device 130. The data may include the real-time monitoring data or monitoring data acquired in a past time period. In some embodiments, the storage device 130 may store the data and/or information to be executed or used by the server 110, and the server 110 may execute or use the data and/or instructions to implement a monitoring operation of the monitoring device 130. In some embodiments, the storage device 150 may include a mass storage device, a removable storage device, a volatile read-and-write memory, a read-only memory (ROM), or the like, or any combination thereof. Exemplary mass storage devices may include a magnetic disk, an optical disk, a solid-state drive, etc. Exemplary removable storage devices may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 120 to implement communication with one or more components in the monitoring system 100 (e.g., the server 110, the monitoring device 130, etc.). One or more components of the monitoring system 100 may access the data and/or information stored in the storage device 150 through the network 120. In some embodiments, the storage device 150 may directly connect or communicate with one or more components of the monitoring system 100 (e.g., the server 110, the monitoring device 130, etc.). In some embodiments, the storage device 150 may be part of the server 110. In some embodiments, the storage device may be part of the monitoring device 130.

The network 120 may facilitate the exchange of the data and/or information. In some embodiments, one or more components in the monitoring system 100 (e.g., the server 110, the storage device 150, the monitoring device 130, etc.) may transmit the data and/or information to other components in the monitoring system 100 through the network 120. For example, the server 110 may obtain the data and/or information from the monitoring device 130 through the network 120. In some embodiments, the network 120 may be any one of a wired network, a wireless network, or a combination thereof. For example, the network 120 may include a cable network, a wired network, an optical fiber network, a telecommunication network, an intranet, the Internet, a local area network (LAN), a wide area network (WAN), a wireless local area network (WLAN), a metropolitan area network (MAN), a public switch telephone network (PSTN), a Bluetooth network, a ZigBee network, a near field communication (NFC) network, or the like, or any combination thereof. In some embodiments, the network 120 may include one or more network access points. For example, the network 120 may include wired or wireless network access points, such as communication base stations and/or Internet exchange points. Through the access point, one or more components of the monitoring system 100 may be connected to the network 120 to exchange the data and/or information.

The monitoring device 130 may obtain data of the surrounding environment. In some embodiments, the monitoring device 130 may transmit the data to the control terminal 140 or the server 110 through the network 120. In some embodiments, the monitoring device 130 may include a storage device, and the monitoring device 130 stores the acquired data in a local storage device. In some embodiments, the monitoring device 130 may include a sensor module. The data may include, but not be limited to, video data, audio data, or sensing data. In some embodiments, the sensor module may include one or more sensors. The sensor may be an external device, or a component or an electronic element of the external device. The sensor module may be one or more sensors integrated on a same electronic component, or a combination of multiple electronic components (each electronic component containing one or more sensors). The types of data that can be acquired by the sensor module include but are not limited to physical data, chemical data, and biological data. As used herein, the physical data includes, but is not limited to, sound, light, time, weight, proximity, position, temperature, humidity, pressure, current, speed, and acceleration, inhalable particles, radiation, text, images, touch, pupils, fingerprints, etc. The chemical data includes, but is not limited to, air pollutants, water pollutants, carbon monoxide concentration, carbon dioxide concentration, etc. The biological data includes, but is not limited to, blood pressure, heart rate, blood sugar, insulin, etc. of an organism. In some embodiments, the device used to detect and/or monitor sound includes, but is not limited to, a microphone. In some embodiments, the device used to detect and/or monitor light includes, but is not limited to, an illuminance sensor, an ambient light sensor, etc.

According to some embodiments of the present disclosure, the server 110 may receive input information and/or display output information through a display device. The input and/or output information may include one or a combination of programs, software, algorithms, data, text, numbers, images, voices, etc. For example, users or operators may input one or more control instructions or conditions through the display device to start the monitoring device 130 for monitoring. In some embodiments, the server 110 may receive the input and/or output information through other external sources. The external source includes, for example, one or a combination of a floppy disk, a hard disk, or a wireless terminal. In this disclosure, the users and operators may be used interchangeably unless exceptions are clearly indicated.

It should be noted that the above description is only for the convenience of description, and does not limit the present disclosure within the scope of the listed embodiments. It should be understood that for those skilled in the art, after understanding the principle of the present disclosure, various modifications and changes in form and detail may be made to the implementation of the monitoring system 100 without departing from the principle. However, these changes and modifications do not depart from the scope of the disclosure.

Figure 2:
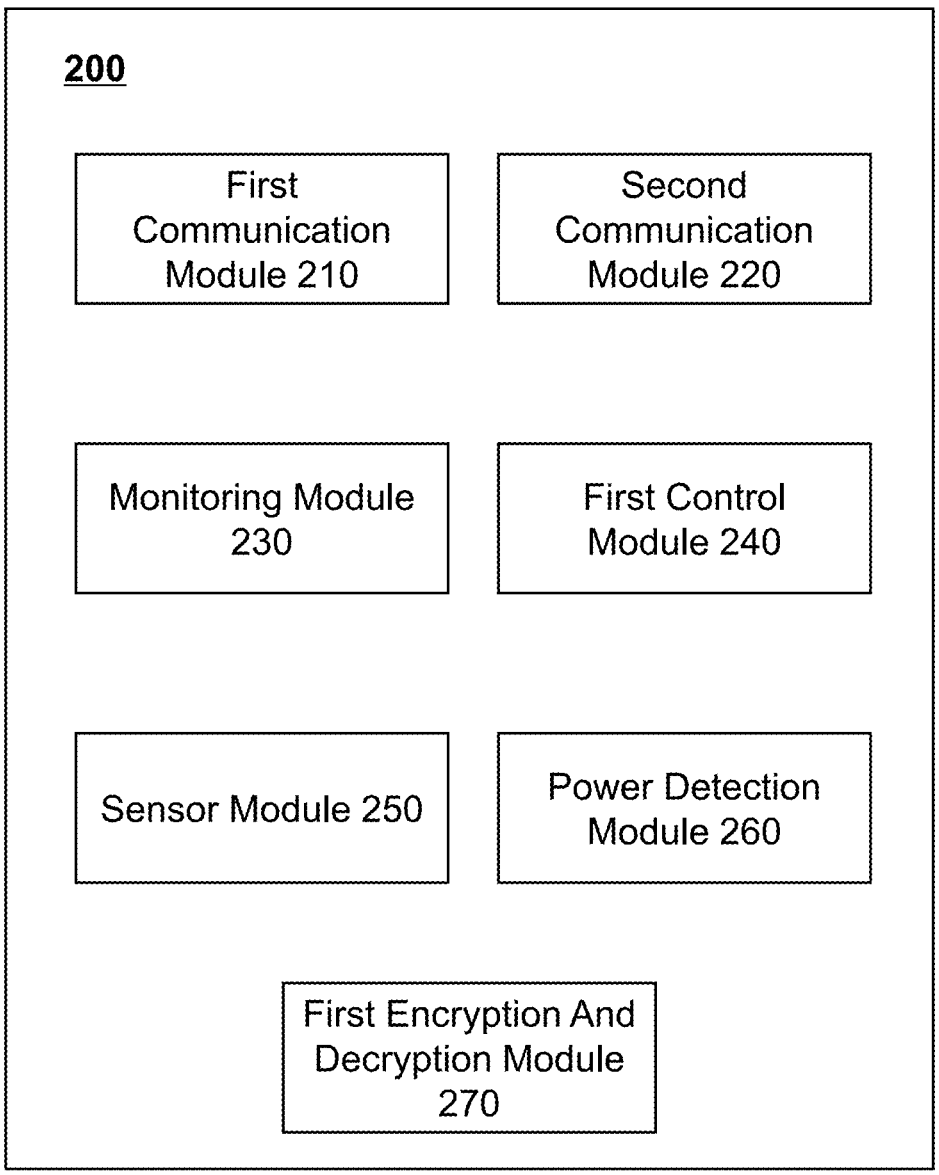
FIG. 2 is a block diagram of a monitoring device 200 according to some embodiments of the present disclosure.

FIG. 2 is a block diagram illustrating a monitoring device 200 according to some embodiments of the present disclosure.

As shown in FIG. 2, the monitoring device 200 may include a first communication module 210, a second communication module 220, a monitoring module 230, and a first control module 240. The monitoring device 130 shown in FIG. 1 may be implemented by the monitoring device 200.

The monitoring module 230 is configured to obtain monitoring data of a surrounding environment of the monitoring device 200.

In some embodiments, the monitoring data may include at least video data, audio data, and/or sensing data.

Figure 3:
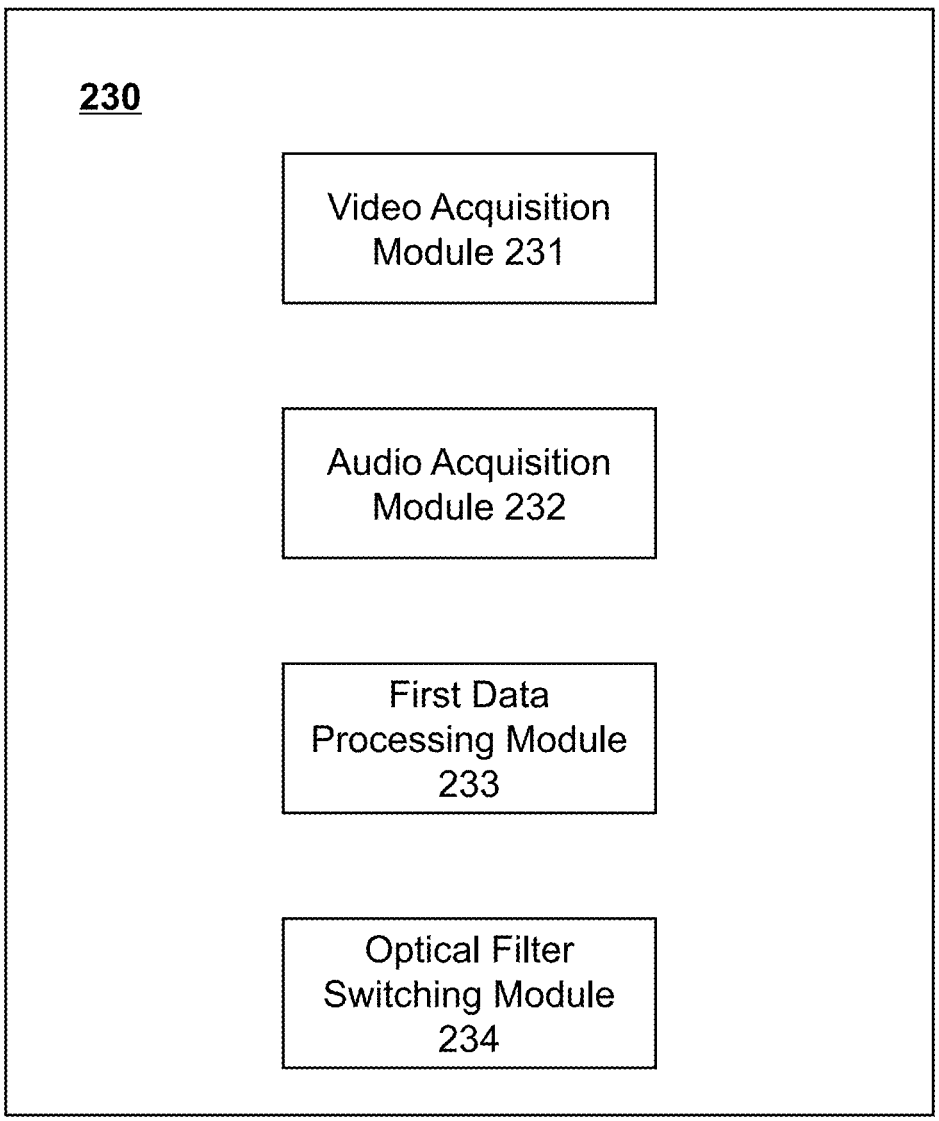
FIG. 3 is a block diagram of a monitoring module 230 according to some embodiments of the present disclosure.

FIG. 3 is a block diagram illustrating a monitoring module 230 according to some embodiments of the present disclosure.

As shown in FIG. 3, the monitoring module 230 includes a video acquisition module 231 and/or an audio acquisition module 232 and a first data processing module 233.

The video acquisition module 231 is configured to obtain video data of the surrounding environment of the monitoring device 200.

In some embodiments, the video acquisition module 231 (e.g., a camera) may collect video information. Images of the video may be static or dynamic images. An angle, a focal length, a resolution, a capturing mode, and a capturing duration of the video acquisition module 231 may be set or adjusted by the control terminal 400 or the monitoring system. In some embodiments, the video acquisition module 231 may process the image information of the collected static image or video to obtain the video data. In some embodiments, the monitoring device 200 may be provided with a physical baffle for a user to choose to open or close, so as to prevent others from remotely operating (e.g., malicious remotely operating) the camera to obtain the information.

The audio acquisition module 232 is configured to obtain audio data of the surrounding environment of the monitoring device 200.

In some embodiments, the audio acquisition module 232 (e.g., a microphone) may obtain audio information (e.g., voice information). The audio acquisition module 232 may receive sound (audio data) via a device such as the microphone when the monitoring module is in a working state, and can process such sound into the audio data. In some embodiments, the audio acquisition module 232 may use various types of noise cancellation (or suppression) algorithms to eliminate (or suppress) noise or interference generated in a process of receiving and transmitting the audio data.

The first data processing module 233 is configured to process the video data and/or the audio data to obtain monitoring data.

In some embodiments, the first data processing module 233 (e.g., a DSP processor) may process the video data and/or the audio data. A processing method includes but is not limited to, data compression, data encoding, and decoding, etc. The processed monitoring data may be sent to the control terminal 400 through the first communication module 210 for displaying, or be stored in a storage device of the local or the monitoring base station 300.

In some embodiments, the monitoring module 230 further includes an optical filter switching module 234 for controlling an optical filter to switch according to a light intensity of the surrounding environment of the monitoring device 200. In some embodiments, the optical filter switching module 230 may use different types of filters according to the light intensity during the day and night. Therefore, the video acquisition module (e.g., a camera) may work during both the day and night to obtain the video data with normal quality.

In some embodiments, the optical filter switching module 234 includes a first filter, a second filter, and a first sensor. When detecting that the light intensity of the surrounding environment of the monitoring device 200 is higher than a preset first light intensity threshold, the first sensor determines that it is currently in daylight, and the first filter is controlled to switch to a working state. When detecting that the light intensity of the surrounding environment of the monitoring device 200 is lower than the preset first light intensity threshold, the first sensor determines that it is currently at night, and the second filter is controlled to switch to the working state. In some embodiments, the first filter may be a 650 nm filter, and the second filter may be an 850 nm or 940 nm filter. In some embodiments, the first sensor may be a photosensitive sensor.

The first communication module 210 is configured to transmit the monitoring data.

In some embodiments, the first communication module 210 may transmit a large amount of data (e.g., the monitoring data). In some embodiments, the first communication module 210 may transmit the monitoring data to the control terminal 400 or the monitoring base station 300 according to a control instruction.

The second communication module 220 is configured to receive the control instruction.

In some embodiments, the second communication module 220 may receive and transmit a small amount of data (e.g., the control instruction). In some embodiments, the second communication module 220 may receive a control instruction from the control terminal 400 or the monitoring base station 300. It should be noted that in the present disclosure, the second communication module 220 is in the working state in various working modes, so as to ensure that the control instruction from the control terminal 400 or the monitoring base station 300 may be received. Therefore, the monitoring device 200 may perform subsequent work according to the control instruction.

In some embodiments, the first communication module 210 may include a communication circuit. The communication circuit may include a circuit for communicating with other devices using various communication protocols. In some embodiments, the communication circuit may include a proximity-based communication circuit (e.g., a near field communication (NFC) circuit and/or an ultrasound circuit), and a relatively wide-area communication circuit (e.g., a wireless network (WiFi) circuit, a cellular circuit, and/or a Bluetooth circuit).

In some embodiments, the NFC circuit may include a powered or unpowered NFC integrated circuit. The integrated circuit may generate, receive, and/or process communication signals according to a radio frequency identification (RFID) standard such as ISO/IEC 14443, ISO/IEC 18092, or FeliCa standard (as examples). In some embodiments, the cellular circuit may include a modular cellular component that generates, receives, and/or processes the communication signal on one or more cellular data networks. In some embodiments, the Bluetooth circuit may include a wireless communication component that generates, receives, and/or processes the communication signal based on, for example, a Bluetooth standard. In some embodiments, the ultrasound circuit may include a high-frequency microphone and a high-frequency speaker for transmitting and receiving sound-based signals at frequencies inaudible to human ears (e.g., greater than 14 kHz or greater than 19 kHz). For example, the ultrasound circuit may be implemented as part or all of the proximity-based communication circuits for the monitoring device 200. The monitoring device 200 generates an ultrasonic signal with a volume that only can be detected within a given distance (e.g., less than a distance between 20 cm and 30 cm) by another device (e.g., the monitoring base station 300 with a corresponding ultrasound communication circuit). In some embodiments, the proximity-based communication circuit for the monitoring device 200 (e.g., a camera) may include any suitable combination of the NFC circuit, the ultrasound circuit, or other suitable proximity-based communication circuits.

In some embodiments, the communication circuit may include other suitable short-range wireless communication standard circuits, wireless broadband components (e.g., a WiMax-based technology), wireless satellite components, or other suitable wireless communication components. In some embodiments, the communication circuit may also be configured as a proprietary wireless communication protocol and interface based on radio frequency (RF), microwave frequency (MWF), infrared frequency (IRF), and/or other suitable wireless transmission technologies. In some embodiments, the communication circuit may include one or more antennas for a wireless communication purpose. In some embodiments, the communication circuit may process, manage, or otherwise facilitate the wireless communication by establishing the wireless communication with a wireless router, a hub, or other suitable wireless devices.

In some embodiments, the second communication module 220 may also include a communication circuit. The communication circuit may include a circuit for communicating with other devices using various communication protocols. In some embodiments, the first communication module 210 and the second communication module 220 may adopt different communication modes.

The first control module 240 is configured to control the monitoring module 230, the first communication module 210, and the second communication module 220 to work.

Figure 8:
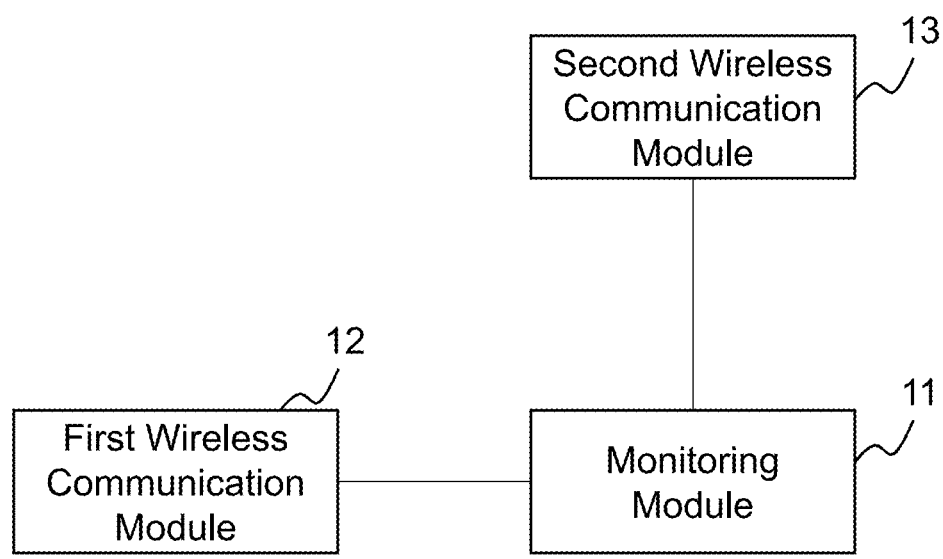
FIG. 8 is a structural diagram of a monitoring device according to Embodiment 1 of the present disclosure.

As an optional example, FIG. 8 is a structural diagram of a monitoring device according to Embodiment 1 of the present disclosure. The monitoring device may be implemented by the monitoring device 200. Referring to FIG. 8, the monitoring device includes a monitoring module 11, a first wireless communication module 12, and a second wireless communication module 13. The monitoring module 11 may be implemented by the monitoring module 230 and is configured to obtain monitoring data of a surrounding environment of the monitoring device. The monitoring data includes audio data and/or video data. The first wireless communication module 12 may be implemented by the first communication module 210. The first wireless communication module 12 is connected to the monitoring module 11 and configured to transmit the monitoring data obtained by the monitoring module 11. The second wireless communication module 13 may be implemented by the second communication module 220. The second wireless communication module 13 is connected to the monitoring module 11 and configured to receive a control instruction for controlling the monitoring device to switch among working modes. The second wireless communication module 13 is a shortwave communication module.

The monitoring device may be an IP camera (IPC). The monitoring module 11 in the IPC obtains the monitoring data of the surrounding environment. The monitoring data includes the audio data and/or the video data. The first wireless communication module 12 may be a WiFi communication module which transmits the monitoring data obtained by the monitoring module 11 to other devices, such as a supporting base station. While transmitting the monitoring data, the WiFi communication module maintains a status communication with the shortwave communication module to inform the shortwave communication module of a transmission progress of the monitoring data, so as to make the shortwave communication module determine whether to control the monitoring device to enter a standby mode. The above description is merely provided for illustration purposes and is not intended to limit the scope of the present disclosure.

In some embodiments, the WiFi communication module includes but is not limited to a radio frequency unit and a data processing module. The radio frequency unit includes but is not limited to a WIFI antenna. The WIFI antenna is used to convert received electromagnetic energy into electromagnetic waves in free space, or to convert electromagnetic waves in free space into electromagnetic energy. The radio frequency unit transmits data processed by the data processing module to the WIFI antenna for transmission, and is also used to transmit the data received by the WIFI antenna to the data processing module. In some embodiments, a number of radio frequency units may be one or more. For example, if the number of radio frequency units is 4, each radio frequency unit corresponds to one WIFI antenna. In some embodiments, one radio frequency unit may correspond to multiple WIFI antennas, which is not specifically limited in the embodiment of the present invention. The data processing module is used for data processing, for example, data to be sent may be processed (e.g., modulation, coding, etc.) for transmitting, and wireless signals (e.g., audio/video data, etc.) received by the WIFI antenna may also be processed (e.g. demodulation, decoding, etc.) for receiving.

The shortwave communication module uses a commercially available shortwave chip with a built-in control unit, which has more comprehensive functions, and is beneficial to shorten the development cycle and reduce difficulty of research and development. The shortwave chip is not described in detail herein, and more descriptions regarding the shortwave chip may be obtained by consulting relevant chip information.

Generally, the IPC communicates with the supporting base station via a wireless communication of WiFi, or directly connects to the Internet network through WiFi. The performance comparisons between the WiFi communication and the shortwave communication in this embodiment include as follows.

1. A minimum power consumption of the WiFi communication is generally maintained at 200 uA, while a power consumption of the shortwave communication to maintain standby may be achieved below 30 uA.

2. Limited by a transmission power, a connection distance that the WiFi communication can maintain is 100-50 meters, while a connection distance that the shortwave communication can maintain is 1000 meters.

3. The number of IPCs that can communicate with one base station at the same time through the WiFi communication is less than 20, but the number of IPCs that use the shortwave communication can be increased to 100.

Based on the descriptions described above, the embodiment adopts a joint communication manner of the WiFi communication and the shortwave communication, which may be compatible with advantages of both the shortwave communication and the WiFi communication, wherein the shortwave communication is used to transmit the instruction and the WiFi communication is used to transmit the monitoring data. In most application scenarios, only when the user needs the monitoring data, the monitoring device is turned on. At other times, the monitoring device is in the standby mode. When the monitoring device is in the standby mode without acquiring the monitoring data, the power consumption of the shortwave communication module is much lower than that of the WiFi communication module, which greatly reduces the power consumption of the monitoring device and extends the working time of the monitoring device on one charging.

Preferably, a communication frequency of the shortwave communication module is less than 1 GHz. A frequency band with the communication frequency less than 1 GHz is referred to as Sub-1 GHz. The Sub-1 GHz has unique performances of providing a long connection distance, a low power consumption, and an overall connection reliability. The long connection distance may be as follows. In a first aspect, the lower the frequency, the longer the connection distance, and a signal attenuation is proportional to the wavelength, so a Sub-1 GHz signal may travel farther than other higher-frequency signals. In a second aspect, the higher the frequency, the greater the signal attenuation after the signal passes through objects such as walls, so the Sub-1 GHz signal has better penetration ability than the 2.4 GHz signal, which may realize a coverage of the whole house and vicinities of the house. In a third aspect, the Sub-1 GHz signal may operate in a narrow band mode, which reduces the possibility of interference and increase the connection distance. The low power consumption may be as follows. In a first aspect, compared with the 2.4 GHz, the Sub-1 GHz may be transmitted with lower power consumption while achieving a same connection distance, which makes the Sub-1 GHz suitable for battery-powered applications. In a second aspect, the Sub-1 GHz may operate in a very noisy environment with severe electromagnetic interference, in which signal reception is not easily interfered by other transmitters, and the number of repeated reception attempts is low, thereby increasing the working life of the battery. In a third aspect, compared with Bluetooth, ZigBee, and WiFi, the Sub-1 GHz may cover the whole house using simple software, and the overall power consumption is low. The reliability may be as follows. In a first aspect, the Sub-1 GHz avoids crowded frequency bands. The 2.4 GHz has Bluetooth, ZigBee, and WiFi, while the Sub-1 GHz is mostly used for connection with low duty cycle, so the possibility of mutual interference is low. In a second aspect, the Sub-1 GHz is not susceptible to interference. The Sub-1 GHz may operate in the narrow band mode to reduce the possibility of interference. In a third aspect, the Sub-1 GHz may provide better narrowband interference protection through frequency hopping. Based on characteristics of the Sub-1 GHz described above, when receiving the control instruction for controlling the monitoring device to switch among working modes, the second wireless communication module 13 of the monitoring device may extend a receiving distance, reduce the power consumption, and ensure the reliability of reception.

In the technical solution of this embodiment, the monitoring device adopts two types of wireless communication modules to transmit the monitoring data and receive the control instruction, respectively. The transmission of the monitoring data and the transmission of the control instruction do not interfere with each other. The control instruction is received through the shortwave communication, which solves technical problems of poor stability and failure to receive the control instruction of the user due to network problems in existing communications, thereby improving user experience. In addition, the shortwave communication module has lower power consumption during the standby mode, which greatly reduces the power consumption of the monitoring device during the standby mode. Besides, the shortwave transmission distance is greatly extended, which may meet the requirements of a long-distance deployment.

In some embodiments, the first control module 240 is configured to control the monitoring device 200 to switch among four working modes according to a control instruction. The working modes include a first working mode, a second working mode, a third working mode, and a fourth working mode.

In some embodiments, when the control instruction is a first working mode instruction, the monitoring device 200 is controlled to switch to the first working mode. The monitoring module 230 and the first communication module 210 stop working, and the second communication module 220 is in a normal working state.

In some embodiments, when the control instruction is a second working mode instruction, the monitoring device 200 is controlled to switch to the second working mode. The monitoring module 230, the first communication module 210, and the second communication module 220 is in a normal working state.

As an optional example, on the basis of the technical solution (Embodiment 1) described above, the monitoring device has a first working mode and a second working mode. In the first working mode, the monitoring module 11 and the first wireless communication module 12 stop working, and the second wireless communication module 13 is in a normal working state. In the second working mode, the monitoring module 11, the first wireless communication module 12, and the second wireless communication module 13 are all in a normal working state.

In Embodiment 2, in the first working mode, the monitoring device is in a standby mode, the monitoring module 11 and the first wireless communication module 12 stop working, and the second wireless communication module 13 maintains a heartbeat communication with a monitoring base station through shortwave wireless signals to ensure that both parties are online. When the monitoring base station initiates the control instruction for controlling the monitoring device to switch among working modes (e.g., a wake-up instruction for switching the monitoring device from the standby mode to the working state) and the second wireless communication module 13 receives the control instruction, the second wireless communication module 13 turns on a power supply of the monitoring device, and the whole device enters the second working mode after powered on. That is, the monitoring module 11 obtains the monitoring data of the surrounding environment, the first wireless communication module 12 transmits the monitoring data, and the second wireless communication module 13 continues to receive the control instruction. The control instruction includes starting to transmit the monitoring data, stopping transmitting the monitoring data, etc. In the second working mode, the monitoring device obtains the monitoring data and transmits the monitoring data in real-time. When the monitoring base station initiates the control instruction for controlling the monitoring device to switch among working modes (e.g., a standby instruction for switching the monitoring device from the working state to the standby mode), or after the first wireless communication module 12 transmits out all the monitoring data, the second wireless communication module 13 turns off the power supply and the monitoring device enters the standby mode again.

Specifically, the control instruction not only includes the control instruction for switching the working mode, but further includes a handshake instruction for establishing a communication connection between the monitoring device and the monitoring base station. The control instruction for switching the working mode includes the standby instruction, a video capturing instruction, a recording instruction, a starting data transmitting instruction, a stopping data transmitting instruction, etc. The above description is merely provided for illustration purposes and is not intended to limit the scope of the present disclosure.

In some embodiments, when the control instruction is a third working mode instruction, the monitoring device 200 is controlled to switch to the third working mode. The first communication module 210 stops working. The monitoring module 230 and the second communication module 220 are in a normal working state. The monitoring module includes a first storage module, and the first storage module is configured to store the monitoring data acquired by the monitoring module in the third working mode.

In some embodiments, when the control instruction is a fourth working mode instruction, the monitoring device 200 is controlled to switch to a fourth working mode. In the fourth working mode, the first communication module 210 and the second communication module 220 are in a normal working state, and the monitoring module stops working.

Figure 9:
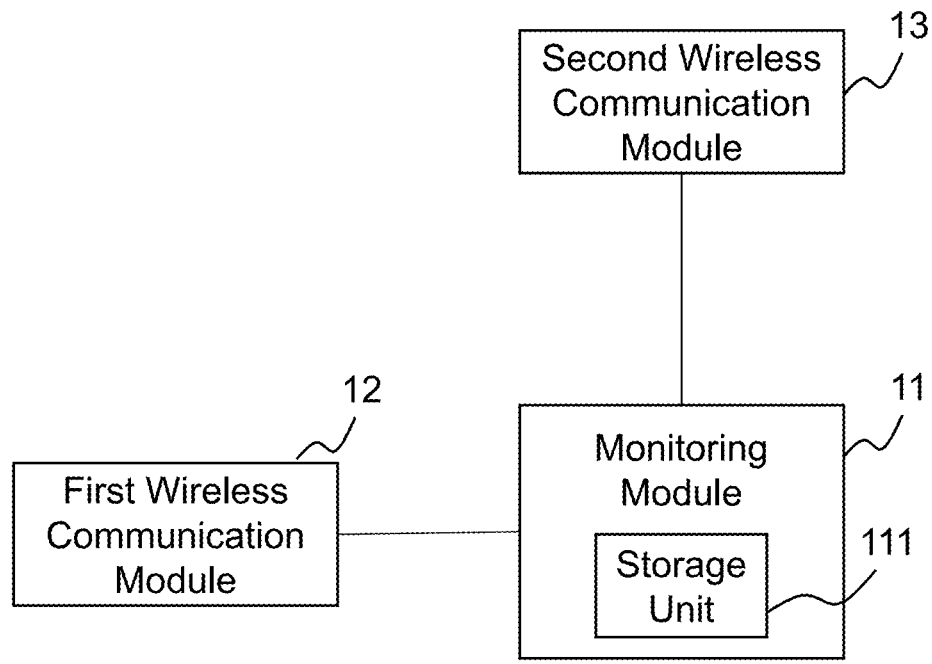
FIG. 9 is a structural diagram of a monitoring device according to Embodiment 2 of the present disclosure.

As an optional example, on the basis of the technical solution (Embodiment 1) described above, FIG. 9 is a structural diagram of a monitoring device according to Embodiment 2 of the present disclosure. Referring to FIG. 9, the monitoring module 11 includes a storage unit 111. The storage unit 111 may be implemented by the first storage module. The monitoring device also has a third working mode and a fourth working mode. The storage unit 111 is configured to store monitoring data obtained by the monitoring module in the third working mode. In the third working mode, the first wireless communication module 12 stops working, and the monitoring module 11 and the second wireless communication module 13 are in a normal working state. In the fourth working mode, the first wireless communication module 12 and the second wireless communication module 13 are in a normal working state, and the monitoring module 11 stops working.

In this embodiment, in the third working mode, the monitoring module 11 obtains the monitoring data and saves the monitoring data in the local storage unit 111. At this time, the first wireless communication module 12 does not need to transmit the monitoring data to the monitoring base station in real-time. The second wireless communication module 13 still receives the control instruction and controls whether the monitoring module 11 continues to capture the monitoring data and save audio and video according to the control instruction. The third working mode is suitable for remote deployment scenarios, such as monitoring living habits of wild animals or a growth status of plants at a specific time. The monitoring device saves the monitoring data of the surrounding environment first. After the monitoring task is completed, the monitoring data can be taken from the monitoring device for statistical analysis. In the fourth working mode, the monitoring module 11 no longer obtains the monitoring data, but transmits the previously stored monitoring data to the monitoring base station via the first wireless communication module 12, while the second wireless communication module 13 still receives the control instruction.

In some embodiments, the monitoring module 230 may include imaging components (e.g., optical elements and one or more imaging sensors). The one or more imaging sensors include, but are not limited to, imaging sensors that are sensitive to light in one or more wavelength bands. In some embodiments, the imaging sensor(s) include, but are not limited to, a visible light sensor, a thermal infrared sensor, a long-wavelength infrared (LWIR) sensor, a mid-wavelength infrared (MWIR) sensor, a short-wavelength infrared (SWIR) sensor, a near-infrared (NIR) sensor, or one or more hybrid image sensors for capturing images in response to light in multiple different wavelength bands. In some embodiments, the imaging sensor(s) may be arranged to receive light through one or more optical elements. The one or more optical elements include, but are not limited to, one or more lenses, filters, films, gratings, prisms, beam splitters, or other suitable optical elements used to filter, focus, zoom, and/or otherwise block, transmit, process, and/or guide light to one or more sensors.

In some embodiments, the first control module 240 controls the monitoring device 200 to switch the working mode according to a preset trigger signal. In some embodiments, the preset trigger signal may be generated by the sensor module 250 or the power detection module 260.

In some embodiments, the monitoring device 200 may further include a sensor module 250 configured to detect whether a preset trigger condition is met in the surrounding environment of the monitoring device 200 and transmit a trigger signal to the first control module 240. The first control module 240 is further configured to control the monitoring device 200 to switch to the second working mode or the third working mode according to the trigger signal. In some embodiments, the preset trigger condition includes a preset threshold for detecting or monitoring physical quantities, for example, a threshold for sound, temperature, etc. When the sensor module 250 detects that any one of the physical quantities of the surrounding environment of the monitoring device 200 exceeds a preset threshold, a trigger signal is generated and transmitted to the first control module 240.

In some embodiments, the sensor module 250 includes, but is not limited to, a sound sensor, a temperature and humidity sensor, an ambient light and proximity sensor, a current sensor, a motion sensor, a fingerprint sensor, and a gas information sensor, or the like, or any combination thereof. The sensor module 250 may perform real-time or regular detection and/or monitoring of variables in the environment. The sensor module 250 may detect and/or monitor various physical quantities, such as sound, light, time, position, temperature, pressure, current, inhalable particles, radiation, text, touch, pupils, fingerprints, etc. The sensor module 250 may detect and/or monitor one or more of the above information, and also may classify each information for further analysis and processing. The first sensor may convert the above-mentioned physical quantities into an electrical signal by detecting and/or monitoring the physical quantities in the environment. The electrical signal may be stored in the storage unit of the monitoring device 130 as sensing data or transmitted to the monitoring base station or control terminal. The data has but is not limited to the following forms: binary, octal, decimal, hexadecimal, hexadecimal, etc.

In some embodiments, the sensor module 250 may obtain time information in real-time by communicating with the monitoring device 130. The time information includes but is not limited to the following forms: nanosecond, microsecond, millisecond, second, minute, hour, year, month, day, morning, afternoon, noon, dawn, dusk, midnight, etc. The sensing data has one or more subjects. The sensing data is subordinate to the one or more subjects, and the sensing data is assigned to the one or more subjects through communication with the monitoring device 130. The subject includes but is not limited to the following contents: living room, bedroom, dining room, balcony, basement, kitchen, TV, personal computer, entrance, etc. It should be noted that the subject listed here of the sensing data is only for easy understanding. The subject possessed by the sensing data can be flexibly defined and classified according to application scenarios, application fields, application objects, etc. The subject possessed by the sensing data may be any one or more entities with extensive possession. The sensing data has but is not limited to the following units such as Celsius, Fahrenheit, Pascal, meter, millimeter, micrometer, ampere, volt, ohm, acre, etc. The monitoring system 100 has a special or universal storage format, and the sensing data, time, subject, unit, etc. are stored in the storage device 150 or server 110 of the monitoring system 100 in the form of the special or universal storage format.

For example, the sensor module 250 may include a sound sensor and a temperature and humidity sensor. The trigger condition set by the sound sensor is a first volume threshold, and the trigger condition set by the temperature and humidity sensor is a first temperature and humidity threshold. When the volume or temperature and humidity of the surrounding environment of the monitoring device 200 exceed the first volume threshold and the first temperature and humidity threshold, the sensor module 250 generates a corresponding trigger signal and transmits it to the first control module 240.

In some embodiments, after the first control module 240 receives the trigger signal, the second communication module 220 transmits an alarm signal.

In some embodiments, the first control module 240 may generate an alarm signal corresponding to the trigger signal according to the received trigger signal and transmit it to the control terminal through the second communication module 220 or the monitoring base station. For example, when the first control module 240 receives the trigger signal generated by the sound sensor, the first control module 240 generates an alarm signal containing such as "abnormal volume", and transmits the alarm signal to the control terminal or monitoring base station to remind the user that the monitoring area is abnormal. As another example, when the first control module 240 receives the trigger signal generated by the temperature and humidity sensor, the first control module 240 generates an alarm signal including such as "abnormal temperature and humidity", and transmits an alarm signal to the control terminal or the monitoring base station.

In some embodiments, after receiving a trigger signal, the first control module 240 may control the monitoring device 200 to switch to the second working mode or the third working mode according to the trigger signal. When an original working mode of the monitoring device 200 is the first working mode, the first control module 240 controls the monitoring device 200 to switch to the second working mode or the third working module. When the original working mode of the monitoring device 200 is the fourth working mode, the first control module 240 controls the monitoring device 200 to switch to the third working module. It should be noted that when the original working mode of the monitoring device 200 is the second working mode or the third working mode, the monitoring device 200 maintains the original working mode.

In some embodiments, the monitoring device 200 may further include a power detection module 260 configured to monitor the power of the monitoring device 200, and output a trigger signal when the power is less than a preset power threshold. The first control module 240 controls the monitoring device 200 to switch to a power-saving working mode according to the trigger signal. In some embodiments, the power detection module 260 may collect the current voltage of the power supply of the monitoring device 200, and compare the current voltage with a pre-stored total voltage of the power supply to obtain a current power of the power supply. When the current power is less than a preset power threshold, the power detection module 260 may generate a corresponding trigger signal and transmit it to the first control module 240. After receiving the trigger signal generated by the power detection module 260, the first control module 240 controls the monitoring device 200 to switch to the power-saving working mode according to the trigger signal.

In some embodiments, in the power-saving working mode, the monitoring module 230 obtains the monitoring data according to a preset periodic interval, and/or the first communication module 220 transmits the monitoring data according to a preset transmitting rate.

In some embodiments, when the original working mode of the monitoring device 200 is the first working mode, and after the monitoring device 200 switches to the power-saving working mode, working states of the monitoring module 230, the first communication module 210, and the second communication module 220 remain unchanged. In some embodiments, when the original working mode of the monitoring device 200 is the second working mode, after the monitoring device 200 switches to the power-saving working mode, the working state of the second communication module 220 remains unchanged. The monitoring module 230 obtains the monitoring data according to the preset periodic interval, and the first communication module 220 transmits the monitoring data according to a preset transmitting rate. In some embodiments, when the original working mode of the monitoring device 200 is the third working mode, after the monitoring device 200 switches to the power-saving working mode, the monitoring module 230 obtains the monitoring data according to the preset periodic interval. The working states of the first communication module 220 and the second communication module 220 remain unchanged. In some embodiments, when the original working mode of the monitoring device 200 is the fourth working mode, after the monitoring device 200 switches to the power-saving working mode, the working states of the monitoring module 230 and the second communication module 220 remain unchanged. The first communication module 220 transmits the monitoring data according to the preset transmitting rate. The periodic interval and the transmitting rate may be set in advance according to actual application conditions, and it only needs to ensure that the power is saved after switching to the power-saving working mode than when working in the original working mode.

In some embodiments, after the first control module 240 receives the trigger signal, the second communication module 220 transmits a warning message of insufficient power.

In some embodiments, after receiving the trigger signal generated by the power detection module 260, the first control module 240 generates prompt information corresponding to the trigger signal and transmits it to the control terminal or the monitoring base station through the second communication module 220. For example, a prompt message including "the monitoring device has insufficient power, has been switched to the power-saving working mode" is generated and sent to the control terminal or the monitoring base station to remind the user that the monitoring device has insufficient power, so that the user can perform subsequent processing in time.

In some embodiments, the monitoring device 200 may further include a prompting module. When receiving the trigger signal, the first control module 240 lights up the prompting module.

In some embodiments, the prompting module includes, but is not limited to, an LED light-emitting tube, a buzzer, or the like, or a combination thereof. The buzzer may include an active buzzer, a piezoelectric buzzer, an electromagnetic buzzer, and the like. The LED light-emitting tube may include an LED lamp bead that emits red light. After receiving the trigger signal, the first control module 240 may light up the LED light-emitting tube to make it emit red light to remind the user near the monitoring device that the device has insufficient power, which is convenient for the user to charge or replace the power supply in time.

Figure 10:
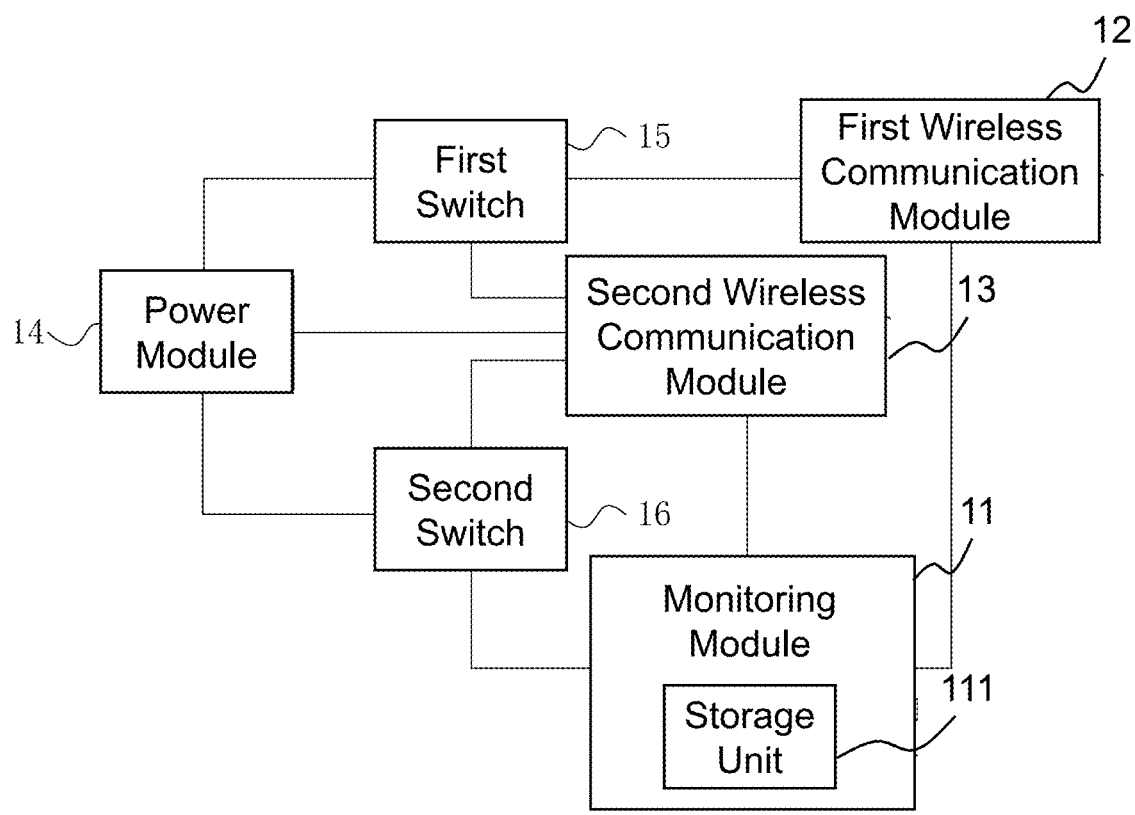
FIG. 10 is a structural diagram of a monitoring device according to Embodiment 3 of the present disclosure.

As an optional example, on the basis of the technical solution (Embodiment 2) described above, FIG. 10 is a structural diagram of a monitoring device according to Embodiment 3 of the present disclosure. Referring to FIG. 10, the monitoring device further includes a power module 14, a first switch 15, and a second switch 16. The power module 14 is connected to the first switch 15, the second switch 16, and the second wireless communication module 13, respectively. The second wireless communication module 13 is connected to the first switch 15 and the second switch 16, respectively. The first switch 15 is connected to the first wireless communication module 12. The second switch 16 is connected to the monitoring module 11. When the second wireless communication module 13 receives a first working mode instruction, the second wireless communication module 13 controls the first switch 15 and the second switch 16 to turn off to stop supplying power to the first wireless communication module 12 and the monitoring module 11. Thus, the first wireless communication module 12 and the monitoring module 11 stop working, and the monitoring device enters a standby mode. When the second wireless communication module 13 receives a second working mode instruction, the second wireless communication module 13 controls the first switch 15 and the second switch 16 to turn on to supply power to the first wireless communication module 12 and the monitoring module 11. Thus, the communication module 12 and the monitoring module 11 work normally, the monitoring module 11 captures the monitoring data and transmits the monitoring data in real-time through the first wireless communication module 12. When the second wireless communication module 13 receives a third working mode instruction, the second wireless communication module 13 controls the first switch 15 to turn off to stop supplying the power to the first wireless communication module 12 and controls the second switch 16 to turn on to supply the power to the monitoring module 11. Therefore, the first wireless communication module 12 stops working, and the monitoring module 11 works normally. The monitoring module 11 captures the monitoring data and saves it locally. When the second wireless communication module 13 receives a fourth working mode instruction, the second wireless communication module 13 controls the first switch 15 to be turned on to supply the power to the first wireless communication module 12 and controls the second switch 16 to turn off to stop supplying the power to the monitoring module 11. Therefore, the first wireless communication module 12 works normally, and the monitoring module 11 stops working. The first wireless communication module 12 transmits out the locally saved monitoring data.

Figure 11:
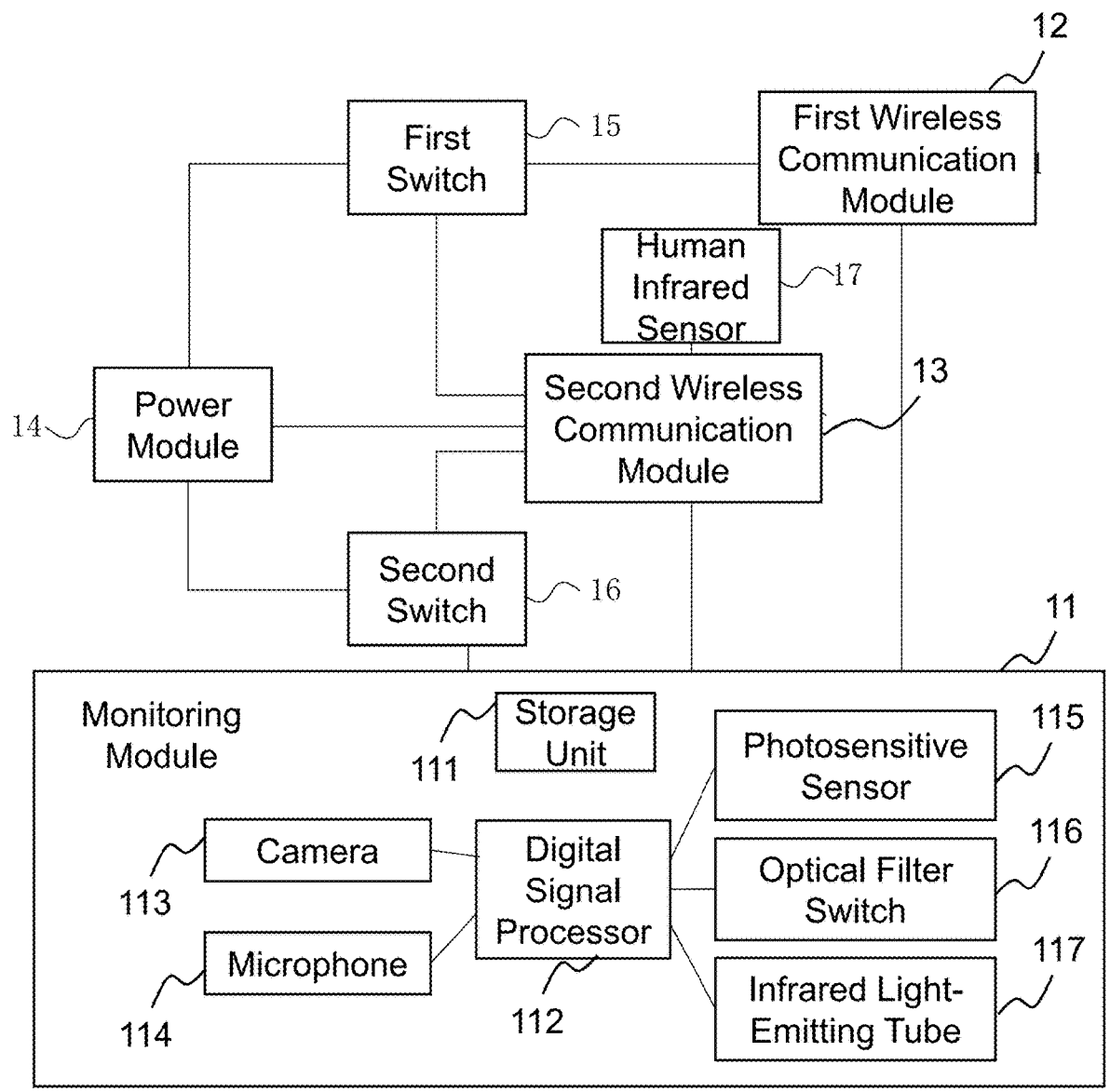
FIG. 11 is a structural diagram of a monitoring device according to Embodiment 4 of the present disclosure.

As an optional example, on the basis of the technical solution (Embodiment 3) described above, FIG. 11 is a structural diagram of a monitoring device according to Embodiment 4 of the present disclosure. Referring to FIG. 11, the monitoring device further includes a human infrared sensor 17. The monitoring module 11 further includes a digital signal processor (DSP) 112, a camera 113 and/or a microphone 114, a photosensitive sensor 115, an optical filter switch 116, and an infrared light-emitting tube 117. The camera 113 and/or the microphone 114 are connected to the DSP 112. The photosensitive sensor 115, the optical filter switch 116, and the infrared light-emitting tube 117 are connected to the DSP 112, respectively. The human infrared sensor 17 is connected to the second wireless communication module 13. After the human infrared sensor 17 detects a trigger signal, the second wireless communication module 13 controls the monitoring device to enter a second working mode or a third working mode. In some embodiments, the second wireless communication module 13 may also transmit a warning signal. The camera 113 is configured to capture video data of the surrounding environment of the monitoring device, and the microphone 114 is configured to record audio data of the surrounding environment of the monitoring device. The photosensitive sensor 115 detects a light intensity of the surrounding environment of the monitoring device. When the light intensity is higher than a preset threshold, the photosensitive sensor 115 controls the optical filter switch 116 to switch to an infrared filter and turn off the infrared light-emitting tube 117. When the light intensity is lower than the preset threshold, the photosensitive sensor 115 controls the optical filter switch 116 to switch to a non-infrared filter and turns on the infrared light-emitting tube 117.

In this embodiment, after the human infrared sensor 17 detects the trigger signal, the second wireless communication module 13 controls the monitoring device to obtain the monitoring data and transmit the monitoring data in real-time, or save the obtained monitoring data locally. The mode that is initiatively triggered may effectively monitor emergencies. For example, in home security, after the monitoring device monitors that a stranger breaks into a house, the monitoring device may timely inform the user to check the monitoring data and call the police, which improves safety.

In some embodiments, the monitoring device 200 may further include a first encryption and decryption module 270 configured to encrypt the monitoring data to obtain encrypted monitoring data and decrypt the received encrypted control instruction to obtain the decrypted control instruction.

Figure 4:
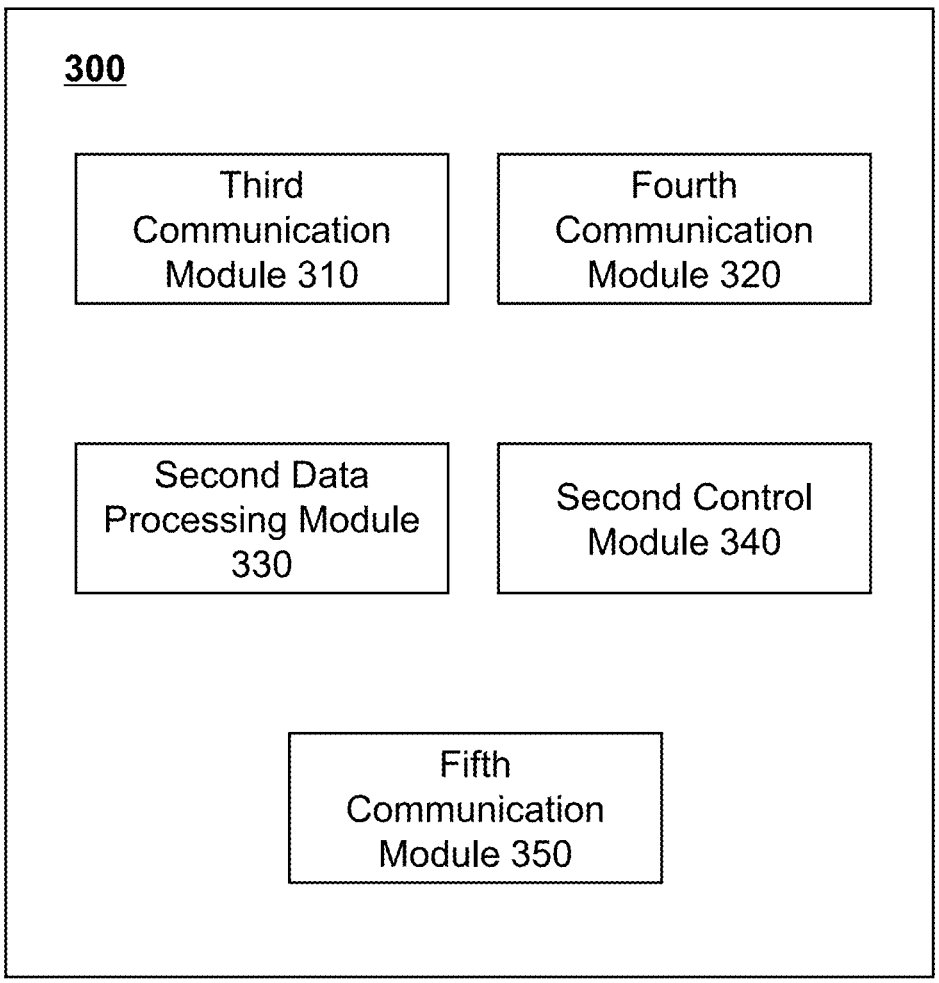
FIG. 4 is a block diagram of a monitoring base station 300 according to some embodiments of the present disclosure.

In some embodiments, the first encryption and decryption module 270 may encrypt the monitoring data obtained by the monitoring module 230 according to the received control instruction, and then it is transmitted to the control terminal or the monitoring base station through the first communication module 210. Encryption algorithms may include but are not limited to DES, 3DES, IDEA, RSA, RC2, RC4, etc. For example, if the monitoring device receives a control instruction instructing to encrypt the transmission of the monitoring data, the first encryption and decryption module 270 encrypts the monitoring data acquired by the monitoring module 230 based on the control instruction, and then transmits it to the control terminal or monitoring base station through the first communication module 210. In some embodiments, the first encryption and decryption module 270 may decrypt the received encrypted control instruction to obtain the decrypted control instruction, so that the monitoring device 200 can perform corresponding actions according to the decrypted control instruction. The encrypted control instruction comes from the control terminal or the monitoring base station. The control terminal, the monitoring base station, and the monitoring device may be pre-configured to have the same encryption and decryption algorithm. FIG. 4 is a block diagram of a monitoring base station 300 according to some embodiments of the present disclosure.

As shown in FIG. 4, the monitoring base station 300 includes a third communication module 310, a fourth communication module 320, a second data processing module 330, and a second control module 340.

The third communication module 310 is configured to receive a control instruction sent by the control terminal 400 and monitoring data sent by the monitoring device 200.

In some embodiments, the third communication module 310 may transmit large amounts of data (e.g., monitoring data), and the fourth communication module 320 may transmit small amounts of data (e.g., control instructions, alarm information, etc.). In some embodiments, the third communication module 310 may include a communication circuit, and the communication circuit may include a circuit for communicating with other devices using various communication protocols.

The fourth communication module 320 is configured to transmit the control instruction.

In some embodiments, the fourth communication module 320 may include a communication circuit, and the communication circuit may include a circuit for communicating with other devices using various communication protocols.

The second data processing module 330 is configured to process the control instruction received by the third communication module 310, and is also configured to process the monitoring data received by the third communication module 310.

The second control module 340 is configured to control the third communication module 310, the fourth communication module 320, and the second data processing module 330 to work.

Figure 12:
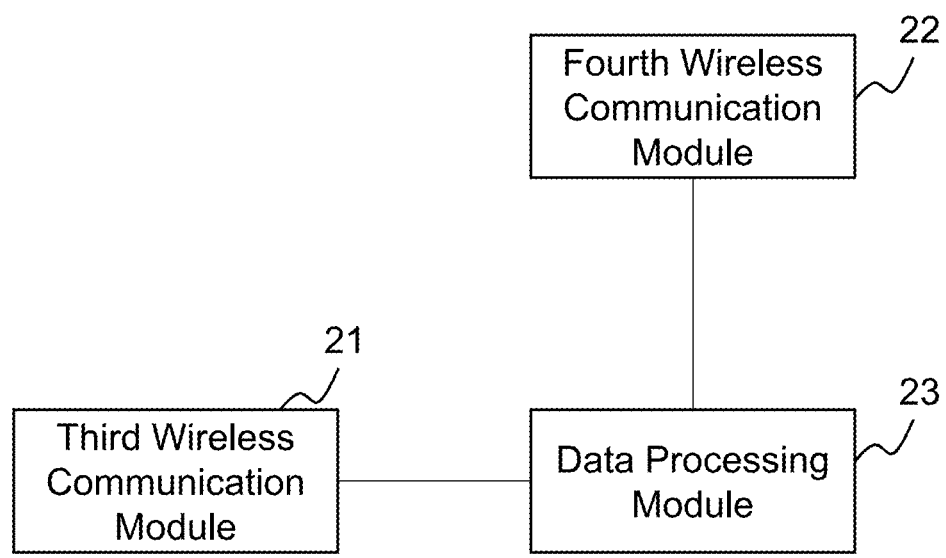
FIG. 12 is a structural diagram of a monitoring base station according to Embodiment 5 of the present disclosure.

As an optional example, FIG. 12 is a structural diagram of a monitoring base station according to Embodiment 5 of the present disclosure. Referring to FIG. 12, the monitoring base station includes a third wireless communication module 21, a fourth wireless communication module 22, and a data processing module 23. The monitoring base station may be implemented by the monitoring base station 300. The third wireless communication module 21 may be implemented by the third wireless communication module 310. The third wireless communication module 21 is configured to receive a control instruction for switching working modes of the monitoring device and monitoring data. The monitoring data includes audio data and/or video data. The fourth wireless communication module 22 may be implemented by the fourth wireless communication module 320. The fourth wireless communication module 22 is configured to transmit the control instruction. The data processing module 23 may be implemented by the second data processing module 330. The data processing module 23 is configured to process the control instruction received by the third wireless communication module, to transmit the control instructions through the fourth wireless communication module, and to process the monitoring data received by the third wireless communication module. The fourth wireless communication module 23 is a shortwave communication module. Specifically, a communication frequency of the shortwave communication module is less than 1 GHz. The third wireless communication module may be a WiFi communication module, which is merely provided for illustration purposes and is not intended to limit the scope of the present disclosure. The third wireless communication module may also be any other communication module that can realize a wireless transmission of the audio data and the video data.

The monitoring base station serves as a transfer between the monitoring device and a mobile terminal of a user. The third wireless communication module 21 and the first wireless communication module 12 of the monitoring device are connected through the WiFi communication. The fourth wireless communication module 22 and the second wireless communication module 13 of the monitoring device are connected through the shortwave communication. As described above, the embodiment adopts a joint communication manner of the WiFi communication and the shortwave communication, which may be compatible with advantages of both the shortwave communication and the WiFi communication, wherein the shortwave communication is used to transmit the instruction and the WiFi communication is used to transmit the monitoring data.

In the technical solution of this embodiment, the monitoring base station adopts two types of wireless communication modules to transmit the monitoring data and receive the control instruction, respectively. The transmission of the monitoring data and the transmission of the control instruction do not interfere with each other. The control instruction is received through the shortwave communication, which solves technical problems of poor stability and easy failure to receive the control instruction of the user due to network problems in existing communications, thereby improving user experience. Besides, the shortwave transmission distance is greatly extended, which may meet the requirements of a long-distance deployment.

In some embodiments, the second control module 340 controls the third communication module 310 and the fourth communication module 320 to work according to a control instruction.

In some embodiments, when the control instruction is a first working mode instruction, the second control module 340 controls the fourth communication module 320 to transmit the first working mode instruction and continues to transmit heartbeat signals. In some embodiments, when the control instruction is a second working mode instruction or a fourth working mode instruction, the second control module 340 controls the fourth communication module 320 to transmit the second working mode instruction or the fourth working mode instruction, and controls the third communication module 330 to receive the monitoring data. In some embodiments, when the control instruction is a third working mode instruction, the second control module 340 controls the fourth communication module to transmit the third working mode instruction.

As an optional example, on the basis of the technical solution (Embodiment 5) described above, when the control instruction is a first working mode instruction, the fourth wireless communication module 22 transmits the first working mode instruction and continuously transmits a heartbeat signal to make the monitoring device enter a standby mode. When the control instruction is a second working mode instruction or a fourth working mode instruction, the fourth wireless communication module 22 transmits the second working mode instruction or the fourth working mode instruction, and controls the third wireless communication module 21 to receive the monitoring data. In the second working mode, the monitoring device normally obtains the monitoring data and transmits the monitoring data to the monitoring base station in real-time. In the fourth working mode, the monitoring device does not obtain the monitoring data, but only transmits the locally stored monitoring data to the monitoring base station. When the control instruction is a third working mode instruction, the fourth wireless communication module 22 transmits the third working mode instruction. In the third working mode, the monitoring device normally obtains the monitoring data and saves the monitoring data locally without transmitting the obtained monitoring data, which is suitable for remote deployment application scenarios.

In some embodiments, the second data processing module 330 further includes a second storage module for storing the monitoring data received by the third communication module 310.

Figure 13:
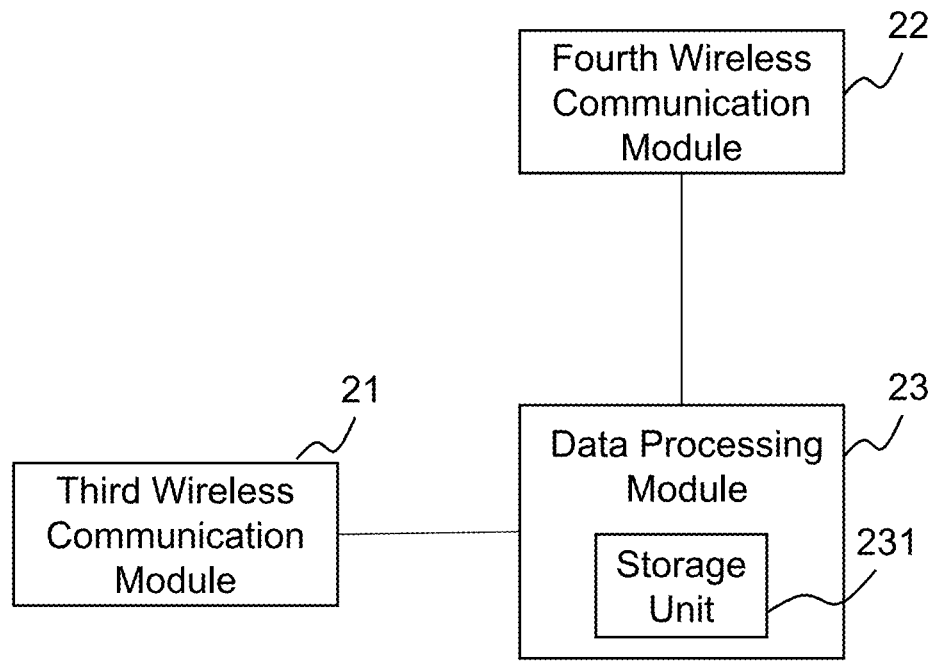
FIG. 13 is a structural diagram of a monitoring base station according to Embodiment 6 of the present disclosure.

As an optional example, on the basis of the technical solution (Embodiment 5) described above, FIG. 13 is a structural diagram of a monitoring base station according to Embodiment 6 of the present disclosure. Referring to FIG. 13, the data processing module 23 includes a storage unit 231. The storage unit 231 may be implemented by the second storage module. The storage unit 231 is configured to store monitoring data received by the third wireless communication module 21. The storage unit 231 may be an SD card. The SD card is a new generation memory device based on semiconductor flash memory, and is widely used in portable devices, such as digital cameras, personal digital assistants, and multimedia players, because of its small size, fast data transmission speed, hot-swappable, and other excellent characteristics. Of course, the storage unit 231 may also be other storage media.

The monitoring base station may store the monitoring data sent by the monitoring device locally and transmit the local monitoring data to a mobile terminal when the mobile terminal transmits out a data request.

In some embodiments, the third communication module 310 is configured to transmit the monitoring data processed by the second data processing module 330.

As an optional example, on the basis of the technical solution (Embodiment 6) described above, the third wireless communication module 21 may be implemented by the third wireless communication module 310. The third wireless communication module 21 is further configured to transmit the monitoring data processed by a data processing module. After the third wireless communication module 21 receives the monitoring data sent by the monitoring device, the data processing module processes and saves the monitoring data.

When the monitoring base station receives an acquisition request for the monitoring data sent by the mobile terminal, the saved monitoring data is transmitted through the third wireless communication module.

In some embodiments, the monitoring base station 300 further includes a fifth communication module 350 configured to receive control instructions from the monitoring device 200 and transmit the monitoring data processed by the second data processing module 330.

In some embodiments, the fifth communication module 350 may include a wired communication circuit. The wired communication circuit may also be configured to interact with wired networks and/or devices via a wired communication component (e.g., an Ethernet interface, a power line modem, a digital subscriber line (DSL) modem, a public switched telephone network (PSTN) modem, a cable modem, and/or other suitable components for wired communication). Proprietary wired communication protocols and interfaces can also be supported by communication circuits. The wired communication circuit may be configured to communicate through a wired communication link (e.g., through a network router, a switch, a hub, or other network devices) for the purpose of wired communication. For example, the wired link can be implemented with power line cables, coaxial cables, optical fiber cables, or other suitable cables or wires that support the corresponding wired network technology.

Figure 14:
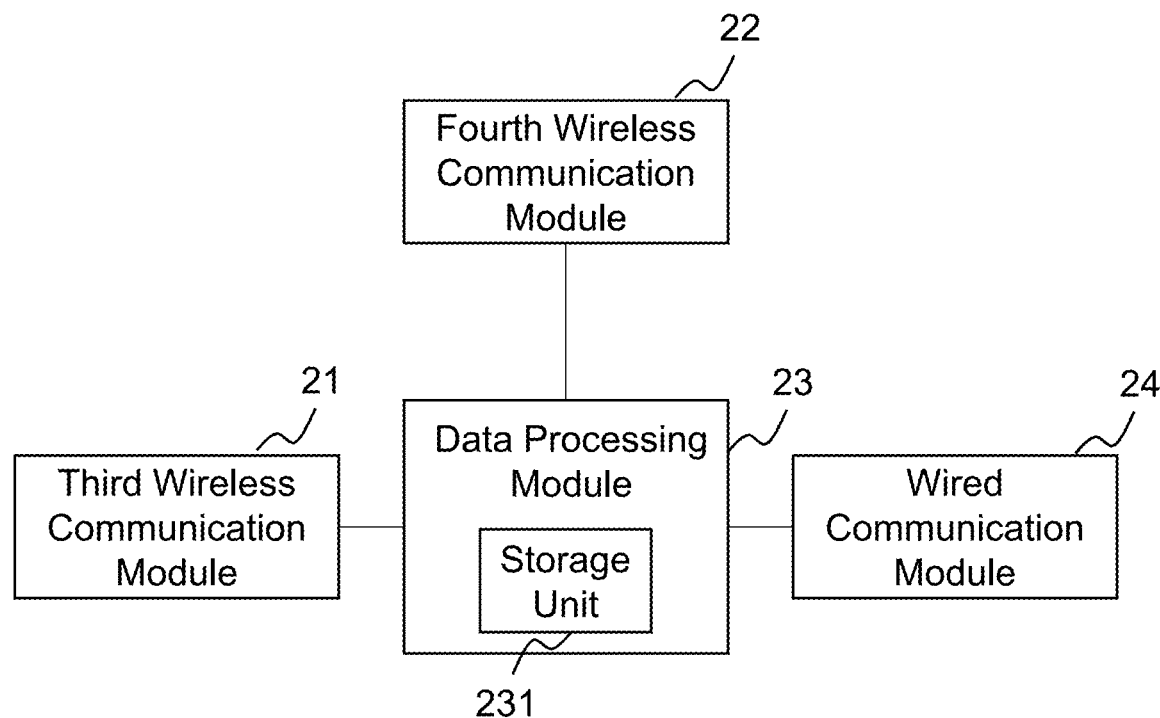
FIG. 14 is a structural diagram of a monitoring base station according to Embodiment 7 of the present disclosure.

As an optional example, on the basis of the technical solution (Embodiment 6) described above, FIG. 14 is a structural diagram of a monitoring base station according to Embodiment 7 of the present disclosure. Referring to FIG. 14, the monitoring base station further includes a wired communication module 24. The wired communication module 24 may be implemented by the fifth communication module 350. The wired communication module 24 is connected to the data processing module 23. The third wireless communication module 21 is configured to receive monitoring data. The wired communication module 24 is configured to receive a control instruction for switching working modes of the monitoring device and transmit the monitoring data processed by the data processing module. In this embodiment, after the wired communication module 24 receives the control instruction sent by a mobile terminal, the control instruction is sent to the monitoring device by the fourth wireless communication module 22. The third wireless communication module 21 receives the monitoring data sent by the monitoring device. The data processing module 23 processes and saves the received monitoring data. After receiving an instruction from the mobile terminal to obtain the monitoring data, the saved monitoring data is sent to the mobile terminal through the wired communication module 24. The wired communication module 24 may include an RJ45 interface.

The monitoring base station may transmit the monitoring data to the mobile terminal through the WiFi communication. The monitoring base station may also transmit the monitoring data to the mobile terminal through the wired communication by establishing an Ethernet wired connection.

Figure 15:
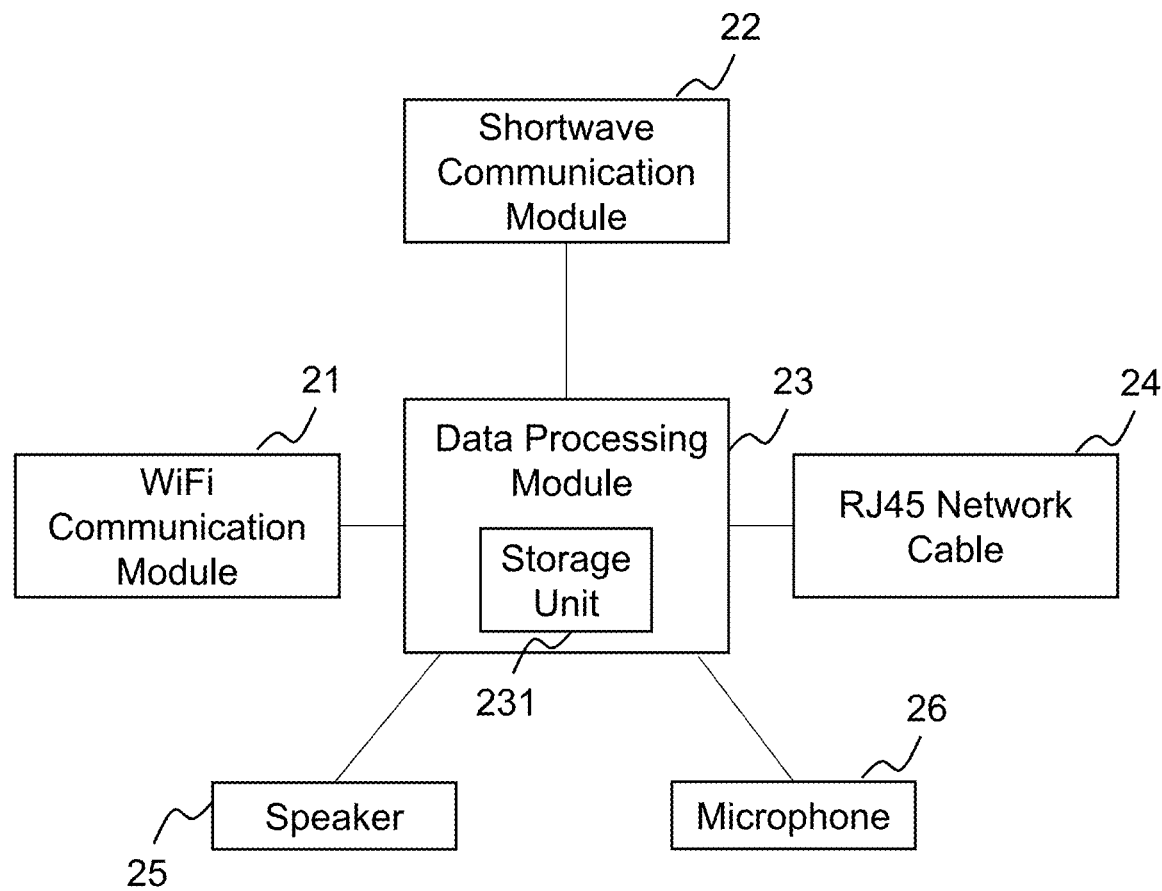
FIG. 15 is a structural diagram of a monitoring base station according to Embodiment 8 of the present disclosure.

As an optional example, on the basis of the technical solution (Embodiment 7) described above, FIG. 15 is a structural diagram of a monitoring base station according to Embodiment 8 of the present disclosure. Referring to FIG. 15, the third wireless communication module 21 adopts a WiFi communication module, the fourth wireless communication module 22 adopts a shortwave communication module, and the wired communication module 24 adopts an RJ45 network cable. The monitoring base station is connected to the Internet through the WiFi communication module or the RJ45 network cable. The WiFi communication module of the monitoring base station is also configured to transmit the monitoring data. The monitoring base station further includes a speaker 25 and a microphone 26. The speaker 25 is configured to play voice prompts, and the microphone 26 is configured to collect audio pairing signals sent by the mobile terminal. The paring of the monitoring base station and the mobile terminal is realized by means of voice, which is more convenient and intelligent.

In some embodiments, the second control module 340 controls the monitoring device 200 to switch the working mode according to a preset trigger signal.

In some embodiments, the second data processing module 330 processes the received monitoring data according to a preset algorithm. When a trigger condition is satisfied, a trigger signal is generated to the second control module 340. The second control module transmits an alarm signal to the control terminal through the fourth communication module 320, and transmits the second working mode instruction to the monitoring device 200.

In some embodiments, the second data processing module 330 is configured to decrypt the encrypted monitoring data to obtain the decrypted monitoring data. The second data processing module 330 is also configured to decrypt the encrypted control instruction to obtain the decrypted control instruction.

Figure 5:
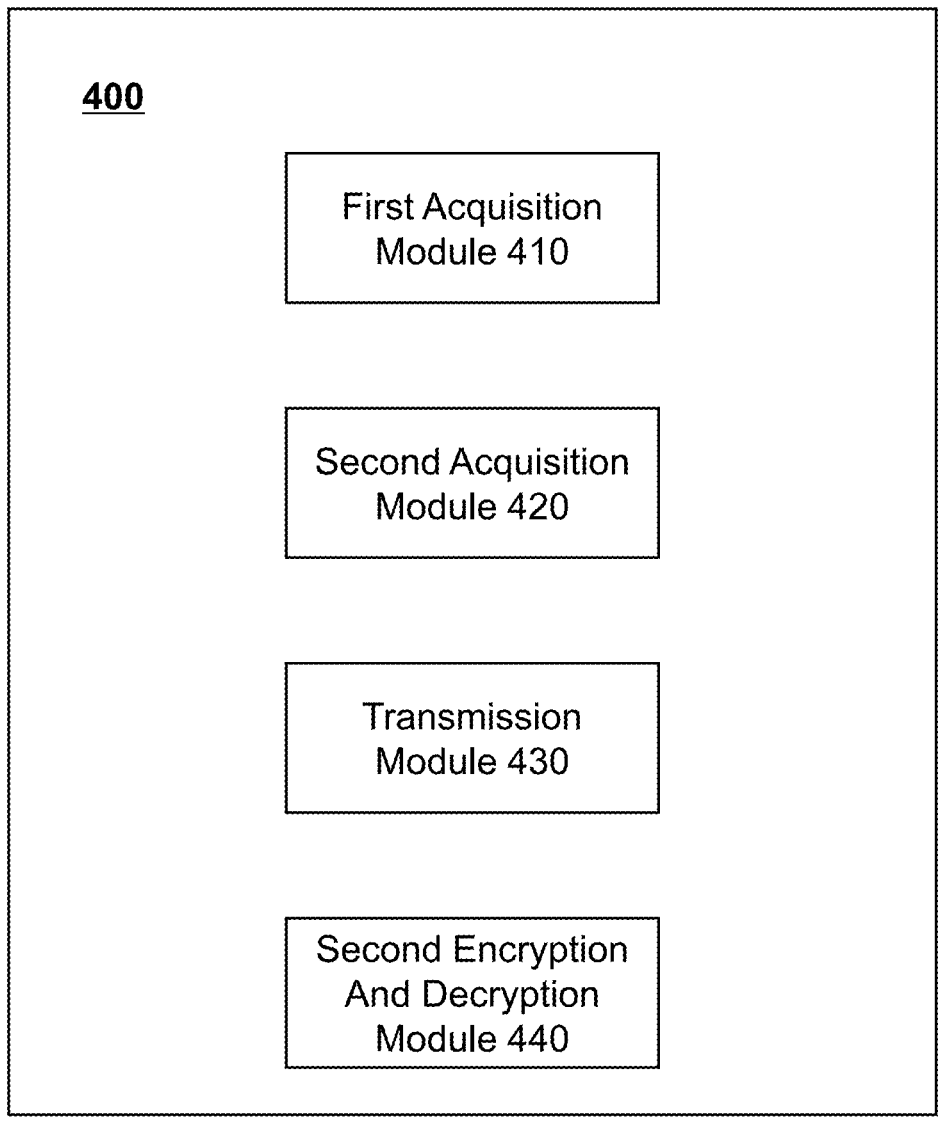
FIG. 5 is a block diagram of a control terminal 400 according to some embodiments of the present disclosure.

FIG. 5 is a block diagram illustrating a control terminal 400 according to some embodiments of the disclosure.

As shown in FIG. 5, the control terminal 400 includes a first acquisition module 410, a second acquisition module 420, and a transmission module 430.

The first acquisition module 410 is configured to obtain data from the monitoring device 200 or the monitoring base station 300.

In some embodiments, the data obtained by the first acquisition module 410 includes at least the monitoring data, warning information of low power, and an alarm signal.

In some embodiments, the control terminal 400 receives, through the first acquisition module 410, the monitoring data, the prompt information and/or the alarm information of insufficient battery, from the monitoring device 200 or relayed by the monitoring base station 300. The monitoring data may be obtained in real-time by the monitoring device 200. Alternatively, the monitoring data is obtained in a certain time period according to a control instruction and stored in the first storage module or the second storage module. In some embodiments, the first acquisition module 410 may include a communication circuit. The communication circuit may include a circuit for communicating with other devices using various communication protocols. In some embodiments, the first acquisition module 410 may include a wired communication circuit.

In some embodiments, the first acquisition module 410 further includes a playing module. The playing module is configured to play the monitoring data based on a form of video and/or audio.

In some embodiments, the playing module may process the monitoring data so that the monitoring data can be displayed on the control terminal 400. The playing module may display a user interface (UI) or a graphical user interface (GUI) related to communication with other devices (e.g., the monitoring base station 300, the monitoring device 200). After the control terminal 400 receives the monitoring data, the playing module may display the UI or GUI of the received video, image, and related functions. The playing module may include a liquid crystal display (LCD), a thin film transistor LCD (TFT-LCD), an organic light emitting diode (OLED) display, a flexible display, a three-dimensional (3D) display, etc. The playing module may also convert the monitoring data received by the control terminal 400 into audio signals and output the audio signals as sound audio. The playing module may include a speaker, a buzzer, etc. In some embodiments, the playing module may provide an audio output related to a specific event (e.g., a prompt sound of insufficient battery, an alarm sound, etc.). The playing module may provide outputs in different manners to notify the occurrence of the event. For example, the playing module may provide the output in a form of vibration. When receiving the prompt information or alarm information of insufficient battery, the playing module may provide a tactile output (e.g., vibration) to notify a user. By providing such tactile output, the user can recognize the occurrence of various events in time.

In some embodiments, the first acquisition module 410 further includes a second encryption and decryption module. The second encryption and decryption module is configured to perform a decryption operation on the encrypted monitoring data to obtain decrypted monitoring data. The second encryption and decryption module is also configured to perform an encryption operation on the control instruction to obtain an encrypted control instruction.

In some embodiments, the second encryption and decryption module adopts the same encryption and decryption algorithm as the first encryption and decryption module and the second data processing module. When the control terminal 400 receives the encrypted monitoring data, the monitoring data is decrypted through the second encryption and decryption module. After the decrypted monitoring data is obtained, the decrypted monitoring data is displayed through the first acquisition module 410. Through performing the encryption and decryption operation on the monitoring data, remote monitoring is made more secure.

The second acquisition module 420 is configured to obtain a control instruction input by the user.

In some embodiments, the second acquisition module 420 may generate a corresponding control instruction according to data input by the user. In some embodiments, the second acquisition module may include, but not be limited to, a keyboard, a touch screen, a scroll wheel, a joystick, etc. The second acquisition module 420 allows the user to input various types of data. The various types of data include data relating to switching working modes, encrypting control instructions, etc. For example, when the user inputs data for switching to a second working mode through the second acquisition module 420, the second acquisition module 420 generates a second working mode instruction. As another example, when the user inputs the data for switching to the second working mode and the data of the encryption control instruction through the second acquisition module 420, the second acquisition module 420 generates the second working mode instruction and performs an encryption operation on the second working mode instruction through the second encryption and decryption module to obtain the encrypted second work mode instruction.

In some embodiments, the control instruction includes at least a first working mode instruction, the second working mode instruction, a third working mode instruction, a fourth working mode instruction, and a power-saving working mode instruction.

In some embodiments, the data that the second acquisition module 420 allows the user to input may further include data relating to setting the working mode of the monitoring device 200 regularly. For example, the user inputs data relating to a setting to regularly obtain the monitoring data from the monitoring device 200 or the monitoring base station 300 through the second acquisition module 420. Subsequently, the second acquisition module 420 generates a corresponding control instruction according to the input data, and transmits, through the transmission module 430, the corresponding control instruction to the monitoring device 200 or the monitoring base station 300. The control instruction may set in advance a time point for the monitoring device 200 to start monitoring or a time period for monitoring. The monitoring device 200 performs the monitoring at the time point or time period, and stores the monitoring time locally or transmit the monitoring time to the monitoring base station.

The transmission module 430 is configured to transmit the control instruction input by the user.

In some embodiments, the transmission module 430 may transmit the control instruction generated by the second acquisition module 420 to the monitoring device 200 or the monitoring base station 300 in a form of an electrical signal. In some embodiments, the transmission module 430 may include a communication circuit. The communication circuit may include a circuit for communicating with other devices using various communication protocols. In some embodiments, the transmission module 430 may include a wired communication circuit.

Figure 6:
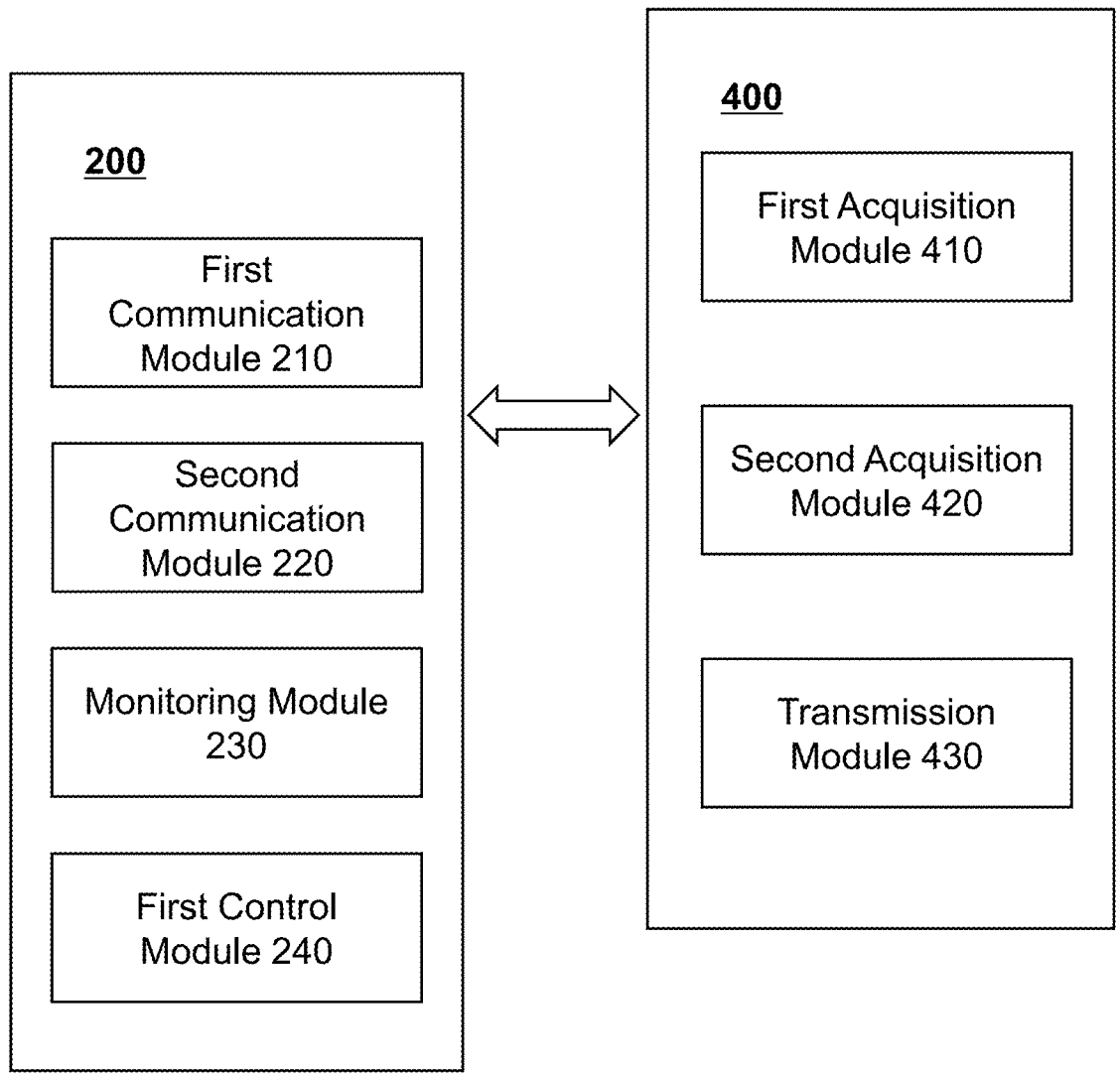
FIG. 6 is a schematic diagram of a monitoring system 500 according to some embodiments of the present disclosure.

FIG. 6 is a schematic diagram illustrating a monitoring system 500 according to some embodiments of the present disclosure.

As shown in FIG. 6, the monitoring system 500 includes at least one monitoring device 200 and at least one control terminal 400. The monitoring device 200 and the control terminal 400 may exchange data and/or information. The monitoring device 200 includes at least a monitoring module 230, a first communication module 210, a second communication module 220, and a first control module 240. The control terminal 400 includes at least a transmission module 430, a first acquisition module 410, and a second acquisition module 420. The control terminal 400 transmits a control instruction to the monitoring device 200 through the transmission module 430. The monitoring device 200 receives the control instruction from the control terminal 400 through the second communication module 220. The monitoring device 200 controls the monitoring module 230, the first communication module 210, and the second communication module 220 to work through the first control module 240 based on the control instruction.

In some embodiments, when the control instruction is a first working mode instruction, the control terminal 400 transmits the first working mode instruction to the monitoring device 200 through the transmission module 430 and continuously transmits heartbeat signals. In some embodiments, when the control instruction is a second working mode instruction or a fourth working mode instruction, the control terminal 400 transmits the second working mode instruction or the fourth working mode instruction to the monitoring device 200 through the transmission module 430, and receives monitoring data from the monitoring device 200 through the first acquisition module 410. In some embodiments, when the control instruction is a third working mode instruction, the control terminal 400 transmits the third working mode instruction to the monitoring device 200 through the transmission module 430. In some embodiments, when the control instruction is the first working mode instruction, the monitoring device 200 controls the monitoring device 200 to switch to a first working mode through the first control module 240, wherein the monitoring module 230 and the first communication module 210 stop working, and the second communication module 220 is in a normal working state. In some embodiments, when the control instruction is the second working mode instruction, the monitoring device 200 controls the monitoring device 200 to switch to a second working mode through the first control module 240, wherein the monitoring module 230, the first communication module 210, and the second communication module 220 are all in a normal working state. The monitoring device 200 obtains monitoring data of a surrounding environment of the monitoring device 200 in real-time. The first communication module 210 transmits the monitoring data to the control terminal 400. In some embodiments, the monitoring module 230 includes a first storage module. The first storage module is configured to store the monitoring data obtained by the monitoring module 230 in the third working mode. When the control instruction is the third working mode instruction, the monitoring device 200 controls the monitoring device 200 to switch to a third working mode through the first control module 240, wherein the first communication module 210 stops working, and the monitoring module 230 and the second communication module 220 are in a normal working state. The monitoring module 230 obtains the monitoring data of the surrounding environment of the monitoring device 200 in real-time, and stores the monitoring data in the first storage module. In some embodiments, when the control instruction is the fourth working mode instruction, the monitoring device 200 controls the monitoring device 200 to switch to a fourth working mode through the first control module 240. In the fourth working mode, the first communication module 210 and the second communication module 220 are in a normal working state, and the monitoring module 230 stops working. The first communication module 210 transmits the monitoring data stored in the first storage module to the control terminal 400.

In some embodiments, the monitoring device 200 further includes a first encryption and decryption module. The first encryption and decryption module is configured to perform an encryption operation on the obtained monitoring data to obtain encrypted monitoring data. The first encryption and decryption module is also configured to perform a decryption operation on a received encrypted control instruction to obtain a decrypted control instruction. The control terminal 400 includes a second encryption and decryption module. The second encryption and decryption module is configured to perform an encryption operation on the control instruction to obtain an encrypted control instruction. The second encryption and decryption module is also configured to perform a decryption operation on the received encrypted monitoring data to obtain decrypted monitoring data. For example, the monitoring system includes a monitoring device A, a monitoring device B, and a control terminal C. The monitoring device A and the monitoring device B may be implemented by the monitoring device 200, and the control terminal C may be implemented by the control terminal 400. The user inputs a control instruction through a second acquisition module of the control terminal C to obtain monitoring data of a surrounding environment of the monitoring device A in real-time, and regularly obtain monitoring data of a surrounding environment of the monitoring device B. Then the control terminal C transmits the second working mode instruction and the third working mode instruction to the monitoring device A and the monitoring device B through the transmission module, respectively. After the monitoring device A receives the second working mode instruction, a working mode of the monitoring device A is switched to the second working mode. A monitoring module of the monitoring device A obtains the monitoring data of the surrounding environment of the device A in real-time and transmits the monitoring data to the control terminal C through a first communication module of the device A. The terminal C obtains the monitoring data from the monitoring device A through a first acquisition module and displays the monitoring data through a playing module. After the monitoring device B receives the third working mode instruction, a working mode of the monitoring device B is switched to the third working mode. A monitoring module of the monitoring device B obtains the monitoring data of the surrounding environment of the device B in real-time, and stores the monitoring data in a first storage module of the device B. As another example, the user inputs a control instruction through a second acquisition module of the control terminal C to require an encrypted transmission, and obtains the monitoring data stored in the monitoring device B. Then the control terminal C encrypts the fourth working mode instruction through the second encryption and decryption module to obtain an encrypted fourth working mode instruction. The transmission module of the terminal C transmits the transmission instruction for encryption and the encrypted fourth working mode instruction to the monitoring device B. The device B decrypts the encrypted fourth working mode instruction through the first encryption and decryption module. After obtaining the fourth working mode instruction, the device B switches the working mode to the fourth working mode and performs the encryption operation on the monitoring data stored in the first storage module through the first encryption and decryption module. After obtaining the encrypted monitoring data, the encrypted monitoring data is sent to the control terminal C through a first communication module of the device B. The terminal C decrypts the encrypted monitoring data through the second encryption and decryption module to obtain the decrypted monitoring data and displays the decrypted monitoring data through the playing module. The monitoring device A and the monitoring device B may transmit information (e.g., prompt information alarm information of insufficient battery, etc.) to the control terminal C through the second communication module according to an obtained trigger signal.

Figure 7:
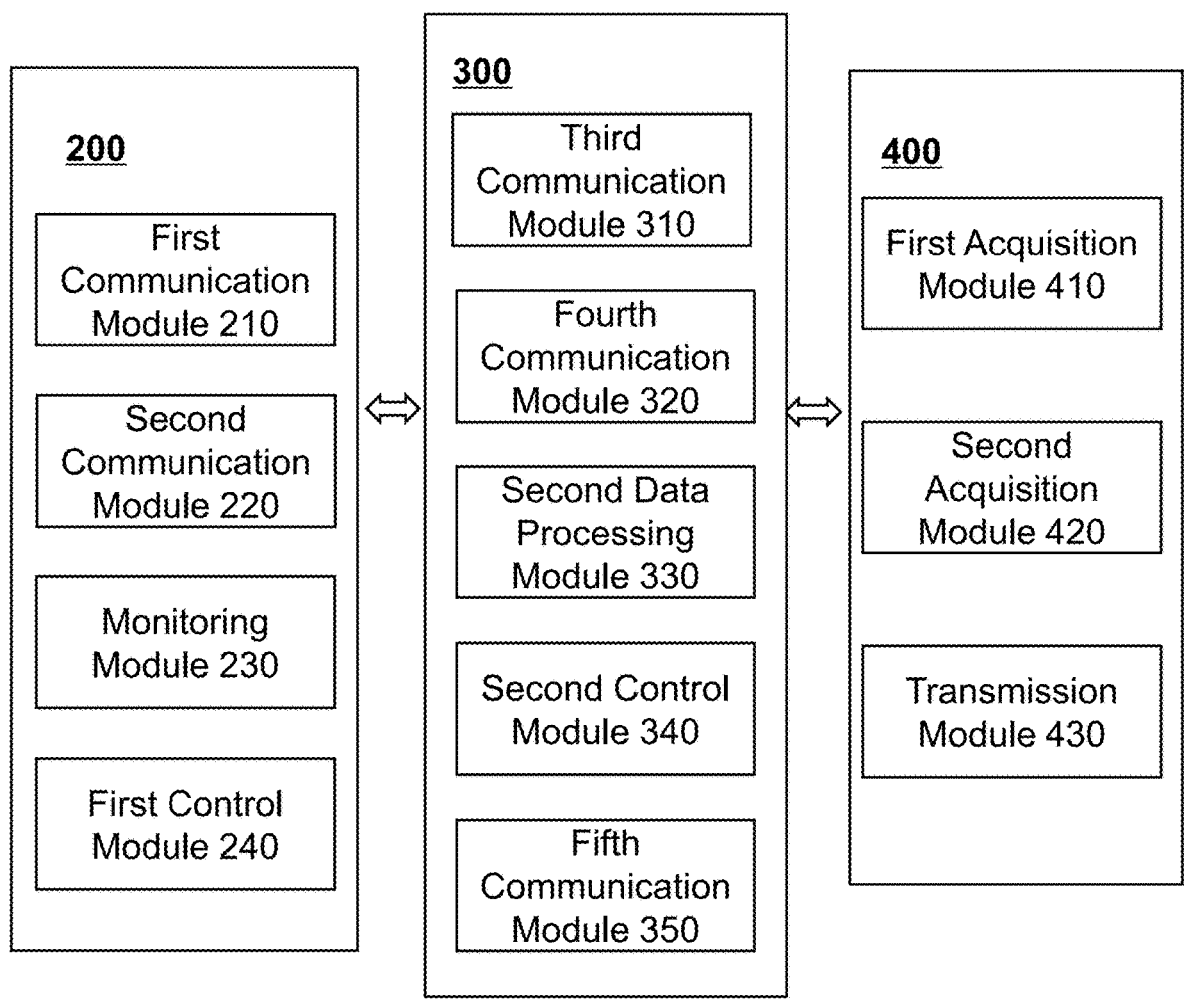
FIG. 7 is a schematic diagram of another monitoring system 600 according to some embodiments of the present disclosure.

FIG. 7 is a schematic diagram illustrating a monitoring system 600 according to some embodiments of the present disclosure.

As shown in FIG. 7, the monitoring system 600 includes at least one monitoring device 200, a monitoring base station 300, and at least one control terminal 400. The monitoring device 200 and the control terminal 400 exchange data and/or information through the monitoring base station 300. The monitoring device 200 includes at least a monitoring module 230, a first communication module 210, a second communication module 220, and a first control module 240. The monitoring base station 300 includes at least a third communication module 310, a fourth communication module 320, a second control module 340, and a second data processing module 350. The control terminal 400 includes at least a transmission module 430, a first acquisition module 410, and a second acquisition module 420. In some embodiments, the control terminal 400 obtains a control instruction input by a user through the second acquisition module 420. The control terminal 400 transmits the control instruction to the monitoring base station 300 through the transmission module 430. The monitoring base station 300 receives the control instruction from the control terminal 400 through the third communication module 310. The monitoring base station 300 transmits the control instruction to the monitoring device 200 through the fourth communication module 320. The monitoring device 200 receives the control instruction from the monitoring base station 300 through the second communication module 220. The monitoring device 200 controls the monitoring module 230, the first communication module 210, and the second communication module 220 to work through the first control module 240 based on the control instruction. The monitoring base station 300 controls the third communication module 310, the fourth communication module 320, and the second data processing module 330 to work through the second control module 340 based on the control instruction.

In some embodiments, when the control instruction is a first working mode instruction, the monitoring base station 300 controls the fourth communication module 320 to transmit the first working mode instruction to the monitoring device 200 through the second control module 340 and continuously transmits heartbeat signals. In some embodiments, when the control instruction is a second working mode instruction or a fourth working mode instruction, the monitoring base station 300 controls the fourth communication module 320 to transmit the second working mode instruction or the fourth working mode instruction to the monitoring device 200 through the second control module 340, and controls the third communication module 310 to receive monitoring data from the monitoring device 200. The monitoring base station 300 transmits the monitoring data to the control terminal 400 through the third communication module 310. The control terminal 400 obtains the monitoring data through the first acquisition module 410. In some embodiments, when the control instruction is a third working mode instruction, the monitoring base station 300 controls the fourth communication module 320 to transmit the third working mode instruction to the monitoring device 200 through the second control module 340. In some embodiments, when the control instruction is the first working mode instruction, the monitoring device 200 controls the monitoring device 200 to switch to a first working mode through the first control module 240, wherein the monitoring module 230 and the first communication module 210 stops working, and the second communication module 220 is in a normal working state. In some embodiments, when the control instruction is the second working mode instruction, the monitoring device 200 controls the monitoring device 200 to switch to a second working mode through the first control module 240, wherein the monitoring module 230, the first communication module 210, and the second communication module 220 are all in a normal working state. The monitoring device 200 obtains monitoring data of a surrounding environment of the monitoring device 200 in real-time. The first communication module 210 transmits the monitoring data to the monitoring base station 300. In some embodiments, the monitoring module 230 includes a first storage module. The first storage module is configured to store the monitoring data obtained by the monitoring module 230 in the third working mode. When the control instruction is the third working mode instruction, the monitoring device 200 controls the monitoring device 200 to switch to a third working mode through the first control module 240, wherein the first communication module 210 stops working, and the monitoring module 230 and the second communication module 220 are in a normal working state. The monitoring module 230 obtains the monitoring data of the surrounding environment of the monitoring device 200 in real-time, and stores the monitoring data in the first storage module. In some embodiments, when the control instruction is the fourth working mode instruction, the monitoring device 200 controls the monitoring device 200 to switch to a fourth working mode through the first control module 240. In the fourth working mode, the first communication module 210 and the second communication module 220 are in a normal working state, and the monitoring module 230 stops working. The first communication module 210 transmits the monitoring data stored in the first storage module to the monitoring base station 300.

In some embodiments, the third communication module 310 is further configured to transmit the monitoring data to the control terminal 400 in the second working mode or the fourth working mode.

In some embodiments, the monitoring base station 300 further includes a fifth communication module 350. The fifth communication module 350 is configured to receive the control instruction from the control terminal 400. The fifth communication module 350 is also configured to transmit the monitoring data to the control terminal 400.

Figure 16:
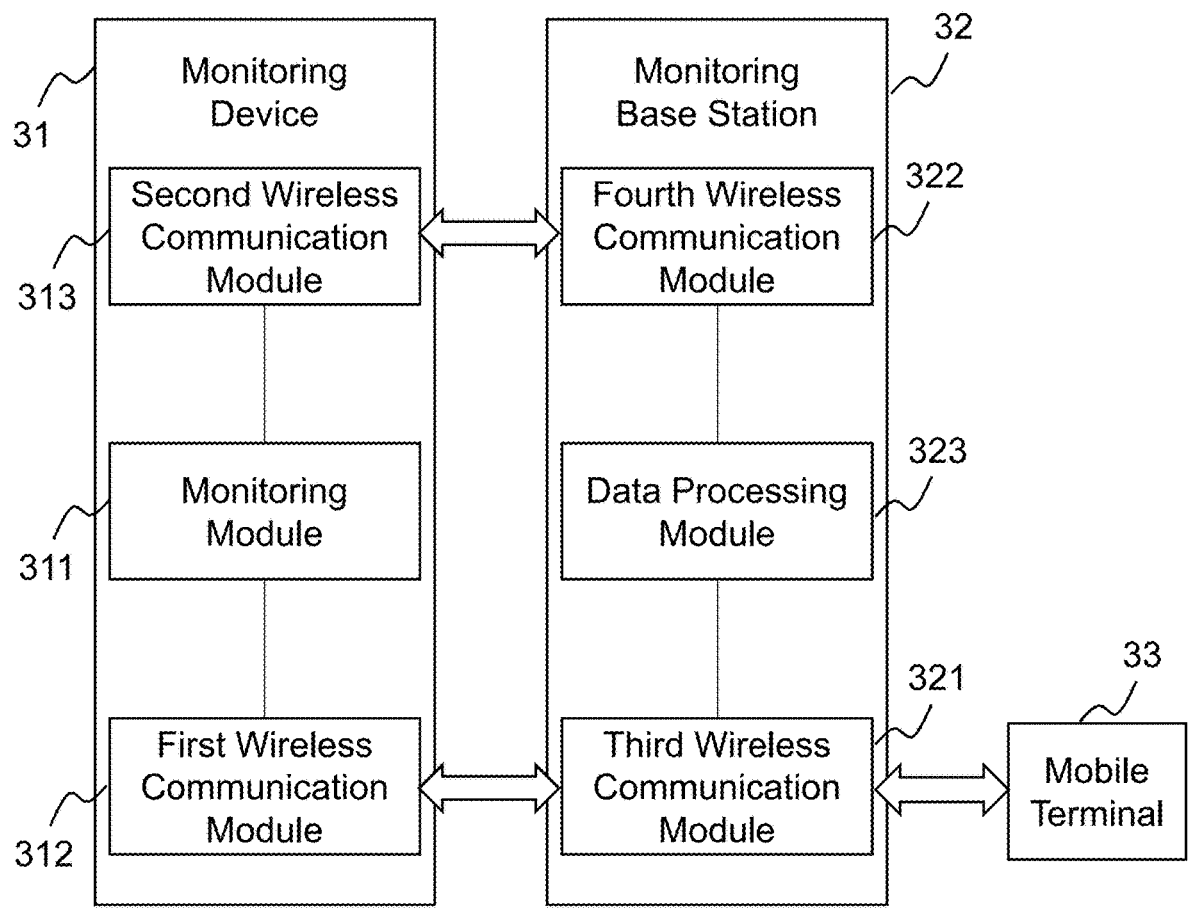
FIG. 16 is a structural diagram of a monitoring system according to Embodiment 9 of the present disclosure.

As an optional example, FIG. 16 is a structural diagram of a monitoring system according to Embodiment 9 of the present disclosure. Referring to FIG. 16, the monitoring system includes a monitoring device 31, a monitoring base station 32, and a mobile terminal 33. The monitoring device 31 may be implemented by the monitoring device 200. The monitoring device 31 includes a monitoring module 311, a first wireless communication module 312, and a second wireless communication module 313. The monitoring module 311 may be implemented by the monitoring module 230. The first wireless communication module 312 may be implemented by the first communication module 310. The second wireless communication module 313 may be implemented by the second communication module 320. The monitoring base station 32 may be implemented by the monitoring base station 300. The monitoring base station 32 includes a third wireless communication module 321, a fourth wireless communication module 322, and a data processing module 323. The third wireless communication module 321 may be implemented by the third communication module 310. The fourth wireless communication module 322 may be implemented by the fourth communication module 320. The data processing module 323 may be implemented by the second data processing module 330. The first wireless communication module 312 communicates with the third wireless communication module 321. The second wireless communication module 313 communicates with the fourth wireless communication module 322. The wireless communication module 321 also communicates with the mobile terminal 33. The mobile terminal 33 may be implemented by the control terminal 400. The mobile terminal 33 transmits a control instruction for switching working modes of the monitoring device to the monitoring base station 32. The monitoring base station 32 receives the control instruction through the third wireless communication module 321 and transmits the control instructions to the monitoring device 31 through the fourth wireless communication module 322. The monitoring device 31 receives the control instruction transmitted by the monitoring base station 32 through the second wireless communication module 313 and executes the control instruction to control the monitoring device 31 to enter the working mode corresponding to the control instruction. Both the second wireless communication module 313 and the fourth wireless communication module 322 are shortwave communication modules.

In the technical solution of this embodiment, the monitoring data and the control instruction are transmitted by adopting two types of wireless communication modules. The control instruction is received through the shortwave communication, which solves technical problems of poor stability and easy failure to receive the control instruction of the user due to network problems in existing communications, thereby improving user experience. Besides, the shortwave transmission distance is greatly extended, which may meet the requirements of a long-distance deployment.

Figure 17:
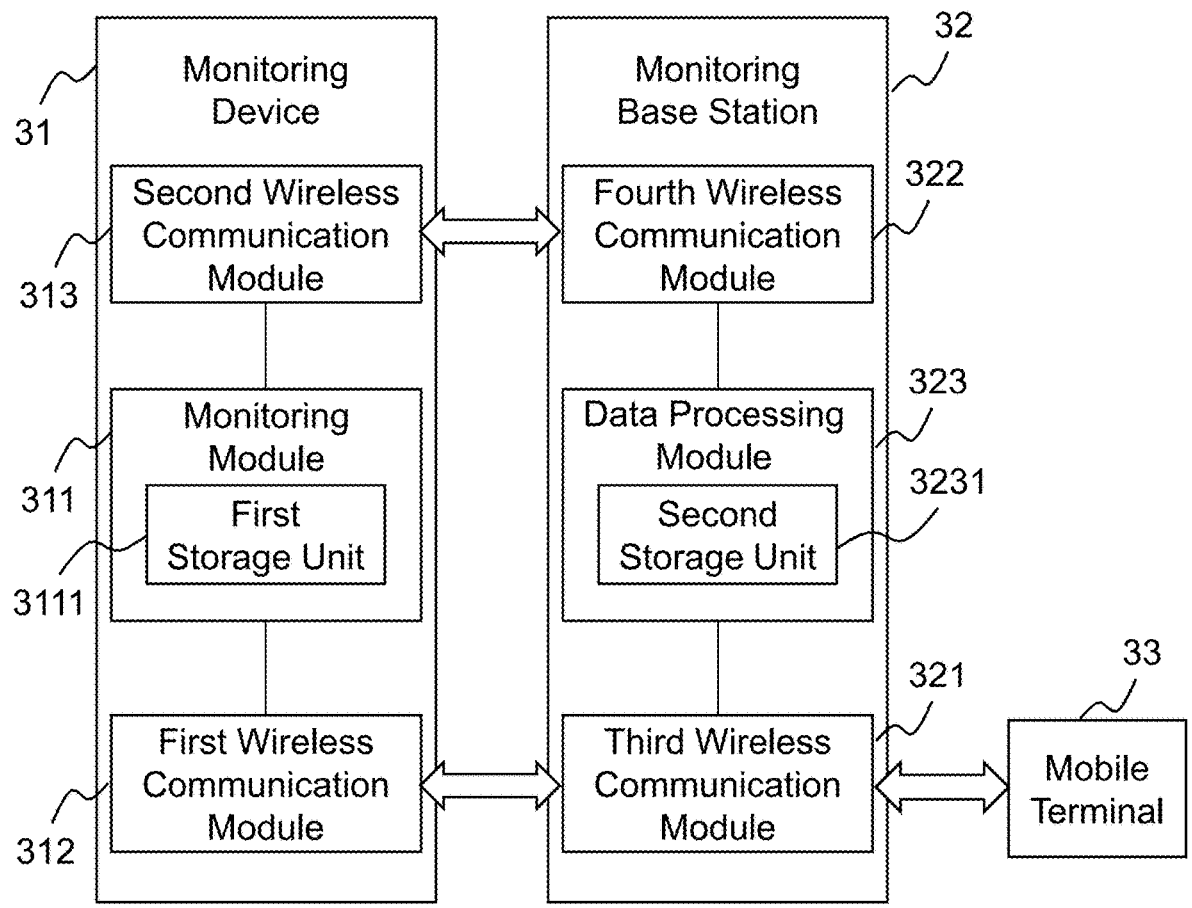
FIG. 17 is a structural diagram of a monitoring system according to Embodiment 10 of the present disclosure.

As an optional example, on the basis of the technical solution (Embodiment 9) described above, FIG. 17 is a structural diagram of a monitoring system according to Embodiment 10 of the present disclosure. Referring to FIG. 17, the monitoring module 311 includes a first storage unit 3111. The first storage unit 3111 may be implemented by the first storage module. The data processing module 323 includes a second storage unit 3231. The second storage unit 3231 may be implemented by the second storage module. When a control instruction is a first working mode instruction, the monitoring device 31 is in the first working mode. The monitoring module 311 and the first wireless communication module 312 stop working, and the second wireless communication module 313 maintains a heartbeat communication with the fourth wireless communication module 322. When the control instruction is a second working mode instruction, the monitoring device 31 is in a second working mode. The monitoring module 311 obtains monitoring data of a surrounding environment of the monitoring device, and the monitoring device 31 transmits the monitoring data to the third wireless communication module 321 through the first wireless communication module 312. When the control instruction is a third working mode instruction, the monitoring device 31 is in a third working mode. The first wireless communication module 312 stops working, and the monitoring module 311 obtains and saves the monitoring data. When the control instruction is a fourth working mode instruction, the monitoring device 31 is in a fourth working mode. The monitoring module 311 stops working, and the monitoring device 31 transmits the monitoring data saved by the monitoring device to the third wireless communication module 321 through the first wireless communication module 312. The first storage unit 3111 is configured to store monitoring data obtained by the monitoring module in the third working mode. The second storage unit 3231 is configured to store monitoring data received by the third wireless communication module 321 in the second working mode or the fourth working mode.

In this embodiment, in the first working mode, the monitoring device 31 is in a standby mode. The monitoring module 311 and the first wireless communication module 312 stop working, and the second wireless communication module 313 maintains the heartbeat communication with the monitoring base station 32 through shortwave wireless signals to ensure that both parties are online. After the monitoring base station 32 initiates the control instruction for controlling the monitoring device to switch among working modes (e.g., a wake-up instruction for switching the monitoring device from the standby mode to the working state) and when the second wireless communication module 313 receives the control instruction, the second wireless communication module 313 turns on the power supply of the monitoring device, and the entire device is powered on and enters the second working mode. That is, the monitoring module 311 obtains the monitoring data of the surrounding environment, the first wireless communication module 312 transmits the monitoring data, and the second wireless communication module 313 continues to receive the control instruction. In the second working mode, the monitoring device 31 obtains the monitoring data and transmits the monitoring data in real-time. When the monitoring base station 32 initiates the control instruction for controlling the monitoring device to switch among working modes (e.g., a standby instruction for switching the monitoring device from the working state to the standby mode), or after the first wireless communication module 312 transmits out all the monitoring data, a message indicating the completion of transmitting the monitoring data is sent to the second wireless communication module 313. The second wireless communication module 13 turns off the power supply and controls the monitoring device to enter the first working mode (i.e., the standby mode). In the third working mode, the monitoring module 311 obtains the monitoring data and saves the monitoring data in a local storage unit. At this time, the first wireless communication module 312 does not need to transmit the monitoring data to the monitoring base station 32 in real-time, and the second wireless communication module 313 still receives control instructions. The third working mode is suitable for remote deployment scenarios in which the monitoring device 31 saves the monitoring data of the surrounding environment first. In the fourth working mode, the monitoring module 311 no longer obtains monitoring data, but transmits the previously stored monitoring data to the monitoring base station 32 via the first wireless communication module 312, while the second wireless communication module 313 still receives control instructions and determines whether to end the transmission of the monitoring data according to the control instructions.

Based on the technical solution described above, the third wireless communication module 321 is further configured to transmit the monitoring data to the mobile terminal 33 in the second working mode or the fourth working mode. This embodiment is applied to an application scenario of wireless data transmission between a base station and a mobile terminal.

Figure 18:
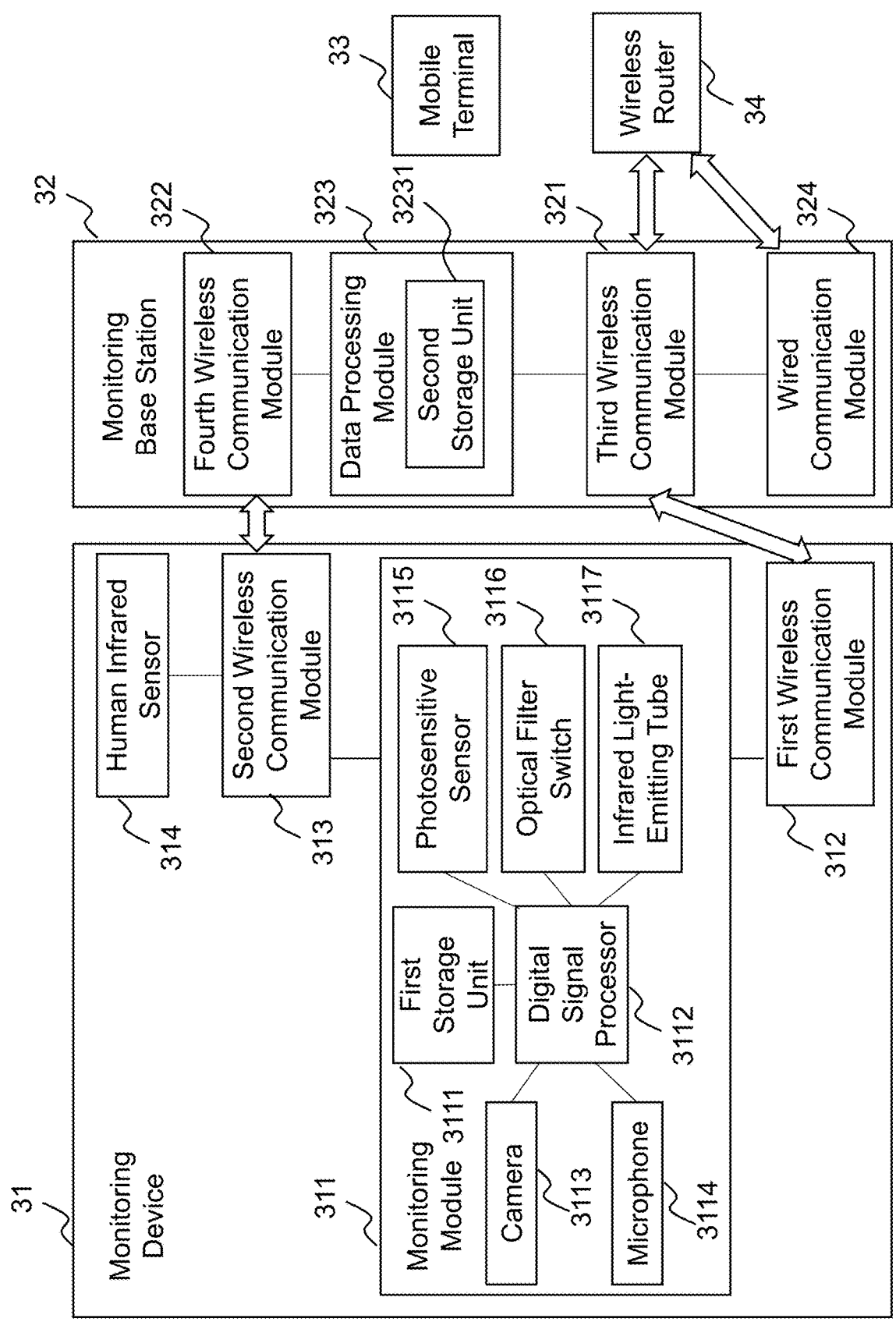
FIG. 18 is a structural diagram of a monitoring system according to Embodiment 11 of the present disclosure.

As an optional example, on the basis of the technical solution (Embodiment 10) described above, FIG. 18 is a structural diagram of a monitoring system according to Embodiment 11 of the present disclosure. Referring to FIG. 18, the monitoring base station 32 further includes a wired communication module 324. The wired communication module 324 may be implemented by the fifth communication module 350. The monitoring device 31 further includes a human infrared sensor 314. The monitoring module 311 further includes a digital signal processor (DSP) 3112, a camera 3113 and/or a microphone 3114, a photosensitive sensor 3115, an optical filter switch 3116, and an infrared light-emitting tube 3117. The monitoring system further includes a wireless router 34. The wired communication module 324 is in communication with the mobile terminal 33 for receiving control instructions and transmitting monitoring data. The human infrared sensor 314 is connected to the second wireless communication module 313. When the human infrared sensor 314 detects a trigger signal, the second wireless communication module 313 controls the monitoring device to enter the second working mode or the third working mode. The camera 3113 and/or the microphone 3114, the photosensitive sensor 3115, the optical filter switch 3116, and the infrared light-emitting tube 3117 is connected to the DSP processor 3112, respectively. The camera 3113 is configured to capture video data of the surrounding environment of the monitoring device, and the microphone 3114 is configured to record audio data of the surrounding environment of the monitoring device. The DSP 3112 is configured to process the video data captured by the camera 3113 and the audio data recorded by the microphone 3114. The photosensitive sensor 3115 detects a light intensity of the surrounding environment of the monitoring device 31. When the light intensity is higher than a preset threshold, the photosensitive sensor 3115 controls the optical filter switch 3116 to switch to an infrared filter and turn off the infrared light-emitting tube 3117. When the light intensity is lower than the preset threshold, the photosensitive sensor 3115 controls the optical filter switch 3116 to switch to a non-infrared filter and turn on the infrared light-emitting tube 3117. The mobile terminal 33 wirelessly communicates with the monitoring base station 32 through the wireless router 34. The monitoring system provided in the embodiment can obtain clear images in environments with different light intensities.

Figure 19:
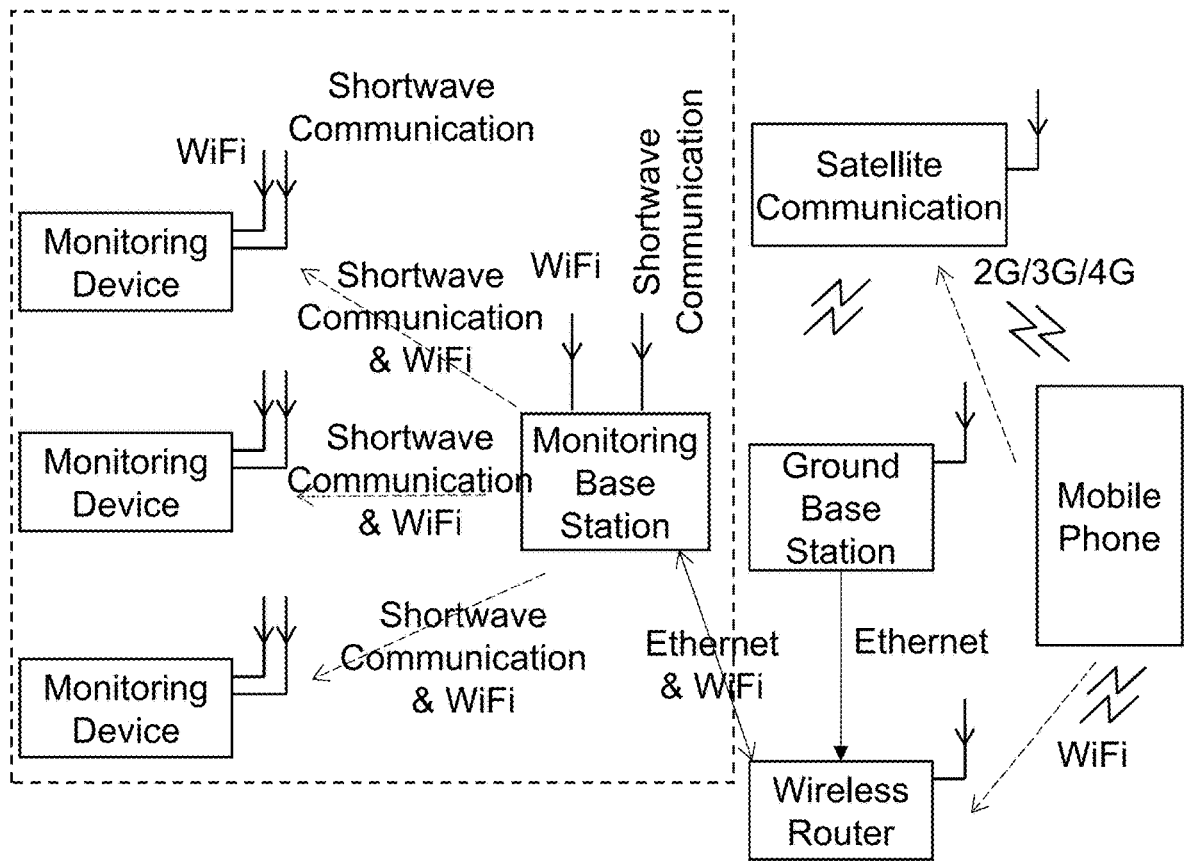
FIG. 19 is a structural diagram of a monitoring system according to Embodiment 12 of the present disclosure.

As an optional example, on the basis of the technical solution (Embodiment 11) described above, FIG. 19 is a structural diagram of a monitoring system according to Embodiment 12 of the present disclosure. Referring to FIG. 19, a mobile phone may communicate with a base station on the ground by a satellite through a data network (2G/3G/4G, etc.). A control instruction is transmitted to the monitoring base station through a wireless router, or the monitoring data is received through the wireless router. Wireless communication between the monitoring base station and the wireless router may be established through a WiFi communication. Alternatively, a wired communication between the monitoring base station and the wireless router may be established through the Ethernet. The monitoring base station and the monitoring device transmit the control instruction and maintain a heartbeat communication through a shortwave of Sub-1 GHz, and transmit the monitoring data through a WiFi communication. The monitoring device transmits the obtained monitoring data to the monitoring base station, and then the monitoring base station saves the monitoring data to a TF card. The monitoring base station can be controlled by the mobile phone controls to upload the monitoring data transmitted from the monitoring device to the server, or perform operations, such as, directly reading and/or viewing the monitoring data. When the monitoring device is set to an infrared trigger mode, once the human infrared sensor senses a trigger signal indicating that someone is walking in a monitoring area, the shortwave communication module of the monitoring device starts the monitoring device to capture the monitoring data. The captured audio and video data may be saved locally. Alternatively, the captured audio and video data may also be sent to the monitoring base station. Meanwhile, the monitoring device transmits an alarm signal to the base station. Then the base station transmits the alarm signal to the mobile terminal to remind the user to check the monitoring data and determine whether an abnormal situation is met within the monitoring area. In some other embodiments, the alarm signal may be generated by the monitoring base station when the monitoring base station receives the audio and video data sent by the monitoring device, and be sent to the mobile terminal for alarming. This is just an example, and there are a variety of specific implementation manners.

In some embodiments, the monitoring system 600 may control the monitoring device 200 and/or the monitoring base station 300 to switch among working modes according to a preset trigger signal. In some embodiments, the monitoring device 200 further includes a sensor module configured to detect whether a preset trigger condition is met in the surrounding environment of the monitoring device 200 and transmit a trigger signal to the first control module 240. The first control module 240 is further configured to control the monitoring device 200 to switch to the second working mode or the third working mode according to the trigger signal.

In some embodiments, the second data processing module 330 may process the received monitoring data according to a preset algorithm. When the trigger condition is satisfied, a trigger signal is generated to the second control module 340. The second control module 340 transmits an alarm signal to the control terminal 400 through the fourth communication module 320 and transmits the second working mode instruction to the monitoring device 200. The preset algorithm may be set according to application scenarios of the monitoring system. For example, when the monitoring system is applied to public transportation (e.g., bus, subway, etc.), the algorithm may include an image processing algorithm, for example, a face recognition algorithm, a face detection algorithm, and so on. By comparing (matching) the recognized face information with the pre-acquired face information including the object that needs a warning, the alarm signal can be sent to the control terminal. After the monitoring operator or related personnel of the control terminal obtains the alarm signal, they can provide warnings to people in the monitored place to remind everyone to strengthen prevention, thereby ensuring public safety.

In some embodiments, the monitoring device 200 includes a first encryption and decryption module configured to encrypt the acquired monitoring data to obtain encrypted monitoring data, and is also used to decrypt the received encrypted control instruction to obtain the decrypted control instruction. The control terminal 400 includes a second encryption and decryption module configured to encrypt the control instruction to obtain encrypted control instruction, and also configured to decrypt received encrypted monitoring data to obtain decrypted monitoring data. The second data processing module is configured to decrypt the encrypted monitoring data from the monitoring device 200 to obtain the decrypted monitoring data, and is also configured to decrypt the encrypted control instruction from the control terminal 400 to obtain the decrypted control instruction. In some embodiments, encryption algorithms include, but are not limited to, DES, RSA, DSA, ECC, DCC, SMAC, etc. In some embodiments, the first encryption and decryption module, the second encryption and decryption module, and the second data processing module may be preset to use the same encryption algorithm. In some embodiments, the first encryption and decryption module, the second encryption and decryption module, and the second data processing module may share an encryption algorithm library, and an encryption algorithm may be randomly selected from the encryption algorithm library to encrypt data. For example, the encryption algorithm may include encryption algorithms such as DES, RSA, DSA, ECC, DCC, SMAC, etc., and each encryption algorithm in the encryption algorithm library corresponds to a sequence identifier. For example, the number 1 identifies the DES algorithm, the number 2 identifies the RSA algorithm, and the number 3 identifies the DSA algorithm. The sequence identifier is included in the encrypted data, so that when the first encryption and decryption module, the second encryption and decryption module, and the second data processing module perform decryption processing, the corresponding decryption algorithm can be selected to decrypt the encrypted data.

It should be understood that the various devices, systems, and modules illustrated in FIGS. 1 to 7 may be implemented in various ways. For example, in some embodiments, the devices, systems, and modules thereof may be implemented as hardware, software, or a combination of software and hardware. The hardware may be implemented using dedicated logics. The software may be stored in a memory and executed by an appropriate instruction execution system, such as a microprocessor, a dedicated design hardware, etc. Those skilled in the art should understand that the above-mentioned methods and systems can be implemented using computer-executable instructions and/or control codes contained in a processor. For example, the control codes may be provided on a carrier medium (e.g., a disk, a CD, or a DVD-ROM), a programmable ROM (PROM), a data carrier such as an optical or electronic signal carrier, etc. The systems and components thereof in the present disclosure may be implemented by semiconductors (e.g., very large scale integrated circuits or gate arrays, logic chips, transistors, etc.), hardware circuits of a programmable hardware device (e.g., a field programmable gate array (FPGA), a programmable logic device (PLD), etc.), a software executed by various types of processors, a combination of the hardware circuit and a software (e.g., firmware), etc.

It should be noted that the above descriptions of the devices, systems, and modules are merely provided for the purposes of illustration, and not intended to limit the scope of the present disclosure. It can be understood that for those skilled in the art, after understanding the principle of the system, it is possible to arbitrarily combine various modules, or form a subsystem to connect with other modules without departing from this principle. For example, in some embodiments, the first communication module 210 and the first control module 240 described in FIG. 2 may be different modules of a system, or one module to realize the functions of two or more modules mentioned above. For example, the first communication module 210 and the first control module 240 may be two modules, or one part that has both communication and control functions. For example, in some embodiments, the third communication module 310 and the second control module 340 described in FIG. 4 may be different modules of a system, or one module to realize the functions of the two or more modules mentioned above. For example, the third communication module 310 and the second control module 340 may be two modules, or one part that has both communication and control functions. For example, in some embodiments, the first acquisition module 410 and the second acquisition module 420 described in FIG. 7 may be different modules of a system, or one module to realize the functions of two or more modules mentioned above. For example, the first acquisition module 410 and the second acquisition module 420 may be two modules, or one part that has both display and input functions. Such deformations are all within the protection scope of this application.

The possible beneficial effects of the embodiments of the present disclosure include, but are not limited to: (1) the monitoring device transmits a large amount of data through the first communication module and transmits a small amount of information through the second communication module, so that it does not need to be connected to the terminal device (e.g., a control terminal, a monitoring base station) at any time, making it more energy saving; (2) the monitoring base station analyzes the monitoring data through algorithms, so that dangerous information can be identified, and an alarm signal can be sent to the terminal device in time, making it more intelligent; (3) the control terminal, the monitoring device, and/or the monitoring base station constitute a monitoring system, so that the control terminal can monitor in real-time through the network, and at the same time, situations of the monitoring device and its monitoring area can obtained in time based on the information (e.g., insufficient battery information, alarm information) sent by the monitoring base station or the monitoring device, making it more convenient and intelligent. It should be noted that different embodiments may produce different beneficial effects. In different embodiments, the possible beneficial effects may be any one or a combination of the above described beneficial effects, or any other beneficial effects that may be obtained.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer-readable media having computer-readable program code embodied thereon.

A non-transitory computer-readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer-readable signal medium may be any computer-readable medium that is not a computer-readable storage medium and that may communicate, propagate, or transport a program for use by or in connection with an instruction execution system, apparatus, or device. Program code embodied on a computer-readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof to streamline the disclosure aiding in the understanding of one or more of the various inventive embodiments. This method of disclosure, however, is not to be interpreted as reflecting an intention that the claimed object matter requires more features than are expressly recited in each claim. Rather, inventive embodiments lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate" or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

It should be noted that the above descriptions are only preferred embodiments of the embodiments of the present disclosure and applied technical principles. Those skilled in the art should understand that the embodiments of the present disclosure are not limited to the specific embodiments described herein, and various obvious variations, readjustments, and substitutions may be made to those skilled in the art without departing from the scope of the present disclosure. Therefore, although the embodiments of the present disclosure are described in detail through the above embodiments, the present disclosure is not limited to the embodiments shown, but to be accorded the widest scope consistent with the claims. Without departing from the concept of the embodiments of the present disclosure, more other equivalent embodiments may be included.

What is claimed is:

1. A monitoring device, comprising:
   a monitoring component configured to obtain monitoring data of a surrounding environment of the monitoring device;
   a first communication circuit configured to transmit the monitoring data;
   a second communication circuit configured to receive a control instruction; and
   a first control circuit configured to control the monitoring component, the first communication circuit, and the second communication circuit, wherein the first control circuit is configured to control the monitoring device to switch among four working modes according to the control instruction, wherein the four working modes include a first working mode, a second working mode, a third working mode, and a fourth working mode;
   wherein
      when the control instruction is a first working mode instruction, the first control circuit controls the monitoring device to switch to the first working mode, wherein the monitoring component and the first communication circuit stop working, and the second communication circuit is in a normal working state;
      when the control instruction is a second working mode instruction, the first control circuit controls the monitoring device to switch to the second working mode, wherein the monitoring component, the first communication circuit, and the second communication circuit are all in a normal working state;
      the monitoring component includes a first storage component, the first storage component is configured to store the monitoring data obtained by the monitoring component in the third working mode;
      when the control instruction is a third working mode instruction, the first control circuit controls the monitoring device to switch to the third working mode, wherein the first communication circuit stops working, and the monitoring component and the second communication circuit are in a normal working state; and
      when the control instruction is a fourth working mode instruction, the first control circuit controls the monitoring device to switch to the fourth working mode, in which the first communication circuit and the second communication circuit are in a normal working state, and the monitoring component stops working.

2. The monitoring device of claim 1, wherein the first control circuit controls the monitoring device to switch to a working mode according to a preset trigger signal.

3. The monitoring device of claim 2, further comprising:
   a sensor configured to detect whether a preset trigger condition is met in the surrounding environment of the monitoring device and transmit a trigger signal to the first control circuit, wherein
   the first control circuit is further configured to control the monitoring device to switch to the second working mode or the third working mode according to the trigger signal.

4. The monitoring device of claim 3, wherein
   after receiving the trigger signal, the first control circuit transmits an alarm signal through the second communication circuit.

5. The monitoring device of claim 2, further comprising:
   a power detection circuit configured to monitor a power of the monitoring device, and output a trigger signal when the power is less than a preset power threshold, wherein the first control circuit controls the monitoring device to switch to a power-saving working mode according to the trigger signal.

6. The monitoring device of claim 5, wherein:
   in the power-saving working mode, the monitoring component obtains the monitoring data according to a preset periodic interval, or the first communication circuit transmits the monitoring data according to a preset transmitting rate.

7. The monitoring device of claim 5, wherein:
   after receiving the trigger signal, the first control circuit transmits a prompting message of insufficient power through the second communication circuit.

8. The monitoring device of claim 5, further comprising:
   a prompt component, wherein when receiving the trigger signal, the first control circuit lights up the prompt component.

9. The monitoring device of claim 1, wherein
   the first communication circuit is configured to transmit the monitoring data to a third communication circuit of a monitoring base station;
   the control instruction is transmitted from a fourth communication circuit of the monitoring base station; and
   the monitoring data and the control instruction are processed by a data processing circuit of the monitoring base station.

10. The monitoring device of claim 1, wherein the monitoring device is controlled by a second control circuit of a monitoring base station to switch to a working mode according to a preset trigger signal.

* * * * *